(12) United States Patent
Anderson et al.

(10) Patent No.: US 8,550,757 B2
(45) Date of Patent: Oct. 8, 2013

(54) FLEXIBLE TRUCK BED TIE-DOWN SYSTEM

(75) Inventors: Michael D. Anderson, San Diego, CA (US); Diane T. Allen, San Diego, CA (US); Stephen D. Ball, San Diego, CA (US)

(73) Assignee: Nissan North America, Inc., Franklin, TN (US)

( * ) Notice: Subject to any disclaimer, the term of this patent is extended or adjusted under 35 U.S.C. 154(b) by 552 days.

(21) Appl. No.: 11/869,505

(22) Filed: Oct. 9, 2007

(65) Prior Publication Data

US 2008/0219795 A1 Sep. 11, 2008

Related U.S. Application Data

(60) Continuation of application No. 11/030,140, filed on Jan. 7, 2005, now Pat. No. 7,281,889, which is a division of application No. 09/874,979, filed on Jun. 7, 2001, now Pat. No. 6,846,140.

(60) Provisional application No. 60/242,724, filed on Oct. 25, 2000.

(51) Int. Cl.
*B60P 7/08* (2006.01)

(52) U.S. Cl.
USPC ............ 410/104; 410/102; 410/106; 410/112

(58) Field of Classification Search
USPC ............ 410/8, 102, 104, 105, 106, 109, 110, 410/112, 113, 116, 130, 150; 24/265 CD, 24/115 K; 296/184.1, 186.1, 39.2; 224/403; 248/499
See application file for complete search history.

(56) References Cited

U.S. PATENT DOCUMENTS

| 2,110,435 | A | 3/1938 | Albin |
| 2,602,691 | A | 7/1952 | Doty |
| 2,685,848 | A | 8/1954 | Meighan et al. |

(Continued)

FOREIGN PATENT DOCUMENTS

| EP | 0 62 8 738 | 12/1994 |
| WO | WO-2004/094194 A1 | 11/2004 |

OTHER PUBLICATIONS

Article—4 Wheel Parts Wholesalers, "Slide-N-Lock", http://www.4wheelparts.com; Oct. 19, 2001 (1 pg.).

(Continued)

*Primary Examiner* — Stephen Gordon
(74) *Attorney, Agent, or Firm* — Foley & Lardner LLP

(57) ABSTRACT

A flexible cargo bed tie-down system allows the user to easily change, adjust, customize, and adapt his or her vehicle to specific needs at any given moment, and interfaces with the rest of the vehicle in an optimum manner from a functional, structural, and aesthetic standpoint. One embodiment of the invention provides a vehicle having a side wall construction enclosing a cargo bed at a side of the cargo bed. The side wall construction includes an outer portion which runs generally vertically at an outer portion of the vehicle, and a top portion which runs generally horizontally from the outer portion toward a longitudinal center of the vehicle. A tie-down rail is mounted adjacent to the top portion such that a part of the top portion overhangs at least a portion of the tie-down rail. The tie-down rail is configured to accept a tie-down fitting and includes a slotted opening generally aligned with an interior edge of the top portion.

16 Claims, 16 Drawing Sheets

(56) References Cited

U.S. PATENT DOCUMENTS

| | | |
|---|---|---|
| 2,688,289 A | 9/1954 | Sterling |
| 2,696,139 A | 12/1954 | Attwood |
| 2,736,272 A | 2/1956 | Elsner |
| 3,005,292 A | 10/1961 | Reiland |
| 3,053,355 A | 9/1962 | Attwood |
| 3,169,792 A | 2/1965 | Solano |
| 3,241,501 A | 3/1966 | Welton |
| 3,478,995 A | 11/1969 | Lautzenhiser et al. |
| 3,643,973 A | 2/1972 | Bott |
| 3,658,012 A | 4/1972 | Caringi |
| 3,722,910 A | 3/1973 | Heckenlaib |
| 3,802,138 A | 4/1974 | McCart |
| 3,831,976 A | 8/1974 | Iden, Sr. |
| 3,877,671 A | 4/1975 | Underwood et al. |
| 3,951,444 A | 4/1976 | Shull |
| 3,972,500 A | 8/1976 | Johnson et al. |
| 4,109,891 A | 8/1978 | Grendahl |
| 4,168,668 A | 9/1979 | Grube et al. |
| 4,226,465 A | 10/1980 | McCullough |
| 4,239,139 A | 12/1980 | Bott |
| 4,248,558 A | 2/1981 | Lechner |
| 4,270,681 A | 6/1981 | Ingram |
| 4,278,376 A | 7/1981 | Hunter |
| 4,285,379 A | 8/1981 | Kowalski |
| 4,396,324 A | 8/1983 | Ellis |
| 4,410,298 A | 10/1983 | Kowalski |
| 4,449,875 A | 5/1984 | Brunelle |
| 4,469,261 A | 9/1984 | Stapleton et al. |
| 4,500,020 A | 2/1985 | Rasor |
| 4,545,697 A | 10/1985 | Verdenne et al. |
| 4,575,295 A | 3/1986 | Rebentisch |
| 4,630,982 A | 12/1986 | Fenner |
| 4,666,355 A | 5/1987 | Stover |
| 4,708,549 A | 11/1987 | Jensen |
| 4,717,298 A | 1/1988 | Bott |
| 4,739,528 A | 4/1988 | Allen |
| 4,741,582 A | 5/1988 | Peroni |
| 4,778,092 A | 10/1988 | Grace |
| 4,784,552 A | 11/1988 | Rebentisch |
| 4,827,742 A | 5/1989 | McDonald |
| 4,840,525 A | 6/1989 | Rebentisch |
| 4,850,063 A | 7/1989 | Abbate |
| 4,850,769 A | 7/1989 | Matthews |
| 4,887,947 A | 12/1989 | Bott |
| 4,911,348 A | 3/1990 | Rasor et al. |
| 4,915,342 A | 4/1990 | Nilsson |
| 4,941,702 A | 7/1990 | Southward |
| D310,017 S | 8/1990 | Matthews |
| 4,948,313 A | 8/1990 | Zankovich |
| 4,950,099 A | 8/1990 | Roellin |
| 4,955,771 A | 9/1990 | Bott |
| 4,961,553 A | 10/1990 | Todd |
| 4,969,784 A | 11/1990 | Yanke |
| 4,984,726 A | 1/1991 | Marshall |
| 5,044,856 A | 9/1991 | Jerabek |
| 5,137,403 A | 8/1992 | McCaffrey |
| 5,143,415 A | 9/1992 | Boudah |
| 5,154,385 A | 10/1992 | Lindberg et al. |
| 5,165,628 A | 11/1992 | Todd et al. |
| 5,188,479 A | 2/1993 | Nehls |
| 5,199,836 A | 4/1993 | Gogarty |
| 5,209,619 A | 5/1993 | Rinderer |
| 5,228,736 A | 7/1993 | Dutton |
| 5,259,711 A | 11/1993 | Beck |
| 5,271,586 A | 12/1993 | Schmidt |
| 5,297,888 A | 3/1994 | Nehls |
| 5,316,357 A | 5/1994 | Schroeder |
| 5,366,327 A | 11/1994 | Nelson |
| 5,370,488 A | 12/1994 | Sykes |
| 5,393,114 A * | 2/1995 | Christensen |
| 5,409,335 A | 4/1995 | Beck |
| 5,411,356 A | 5/1995 | Travis et al. |
| 5,433,550 A | 7/1995 | Huber |
| 5,433,566 A | 7/1995 | Bradley |
| 5,494,388 A | 2/1996 | Stevens |
| 5,533,848 A | 7/1996 | Davis |
| 5,560,666 A | 10/1996 | Vieira et al. |
| 5,628,598 A | 5/1997 | Hoefle |
| 5,655,865 A | 8/1997 | Plank et al. |
| 5,674,033 A | 10/1997 | Ruegg |
| 5,676,508 A | 10/1997 | Weicht |
| 5,690,460 A | 11/1997 | Attanasio |
| 5,704,571 A | 1/1998 | Vargo |
| 5,765,978 A | 6/1998 | Looker et al. |
| 5,775,652 A | 7/1998 | Crawshaw et al. |
| 5,779,412 A | 7/1998 | Nagai et al. |
| 5,794,901 A | 8/1998 | Sigel |
| 5,820,322 A | 10/1998 | Hermann et al. |
| 5,823,724 A | 10/1998 | Lee |
| 5,823,727 A | 10/1998 | Lee |
| 5,827,023 A | 10/1998 | Stull |
| 5,893,538 A | 4/1999 | Onishi et al. |
| 5,915,900 A | 6/1999 | Boltz |
| 5,947,356 A | 9/1999 | Delong |
| 5,961,263 A | 10/1999 | Nunez |
| 5,975,822 A | 11/1999 | Ruff |
| 6,010,287 A | 1/2000 | Sommermeyer et al. |
| 6,017,071 A | 1/2000 | Morghen |
| 6,022,164 A | 2/2000 | Tsui et al. |
| 6,050,763 A | 4/2000 | Swailes |
| RE36,681 E | 5/2000 | Rinderer |
| 6,059,498 A | 5/2000 | Ostrowski |
| 6,086,300 A | 7/2000 | Froehlich |
| 6,113,328 A | 9/2000 | Claucherty |
| 6,196,777 B1 | 3/2001 | Price |
| 6,213,539 B1 | 4/2001 | Williams et al. |
| 6,238,153 B1 | 5/2001 | Karrer |
| 6,250,861 B1 | 6/2001 | Whitehead |
| 6,260,813 B1 | 7/2001 | Whitcomb |
| D446,442 S | 8/2001 | Simpson |
| 6,270,301 B1 | 8/2001 | Dunlop |
| 6,290,426 B1 | 9/2001 | Van Gijsel et al. |
| 6,334,750 B1 | 1/2002 | Hsieh |
| 6,336,766 B1 | 1/2002 | De Villele |
| 6,336,779 B1 | 1/2002 | Jakob et al. |
| 6,338,599 B1 | 1/2002 | Uno |
| 6,338,649 B1 | 1/2002 | Smith |
| 6,439,814 B1 | 8/2002 | Floe |
| 6,585,465 B1 | 7/2003 | Hammond et al. |
| 6,592,310 B2 | 7/2003 | Hyp et al. |
| 6,644,901 B2 | 11/2003 | Breckel |
| 6,846,140 B2 * | 1/2005 | Anderson et al. ............. 410/104 |
| 6,846,142 B2 | 1/2005 | Gens |
| 6,910,609 B2 | 6/2005 | Williams et al. |
| 7,281,889 B2 * | 10/2007 | Anderson et al. ............. 410/104 |
| 2002/0048495 A1 | 4/2002 | Anderson et al. |
| 2002/0164225 A1 | 11/2002 | Snyder et al. |
| 2005/0036848 A1 | 2/2005 | Cunningham et al. |
| 2005/0145662 A1 | 7/2005 | Williams et al. |

OTHER PUBLICATIONS

Article—Detroit Auto Show 2001—Toyota Matrix;http://203.139.122.131/motorshow/international/matrix/matrix_4.html; Mar. 14, 2001, 2 page.

Article—Ford Motor Company, "Mercury accessories", pp. 1-23.

Article—Hi-Lift.com web site; Oct. 16, 2001 (8 pgs.).

Article—MaxRax "The Solution to Your Hauling Problem", http:www.truckracks.com/; Jul. 27, 2000, 1 page.

Article—Midland-Ross Corporation, "Goldguard—New standard in corrosion protection from Superstrut", Superstrut Division, Oakland, CA, 1 page.

Article—MIRAGE Truck Rack; "The Original Disappearing Rack"; U.S. Patent 5,143,415; Mirage truck rack accessories; http:www.altech.ab.ca/jembrack/mirage3.htm; Nov. 14, 2000, 2 pages.

Article—Professional Series Storage Drawers by Geneva, TruckStuff USA, http://www.truckstuffusa.com/gnv62357.html; Jul. 27, 2000, 1 page.

Article—Rockcrawler.com, "Slide-N-Lock" http://www.rockcrawler.com; Oct. 19, 2001 (3 pgs.).

Article—Saddlepack Storage Systems for Long Bed Trucks by Steel Horse, TruckStuff USA, http://www.truckstuffusa.com/ste58202.html; Jul. 27, 2000, 1 page.

Article—Superstrut, "Metal Framing Channel & Pipe Hangers—Typical Applications", pp. 1-4 (1984).
Article—Superstrut, "Superstruts Products From BCR, Inc., Building Specialties", pp. 1-4.
Article—Superstrut, "Total Support Systems", Superstrut Division—Illustrated Price List, pp. 1-41 (1986).
Article—SystemOne Modular Truck Equipment, Christensen Manufacturing, http:www.christensenmfg.com/html/features.html; Jul. 27, 2000, 2 pages.
Article—Toyota's 2001 Toyota Matrix—"Connect. toyota.com/matrix," Toyota Motor Sales, U.S.A., 4 pages.
Article—Toyota's 2001 Toyota Matrix—Truckworld Online!; http://www.truckworld.com/Sport-Utility/01-toyota-matrix/01-toyotamatrix.html; Mar. 7, 2001, 4 pages.
Article—TracRac, "Attention!", Caution Sheet, TracRac , Fall River, MA, 2 pages (1998).
Article—TracRac, "Cantilever Extension Assembly & Packing Checklist", TracRac , Fall River, MA, 5 pages (1999).
Article—TracRac, "Cargo Holder Assembly", TracRac , Fall River, MA, 2 pages (1998).
Article—TracRac, "Locking TracKnob Installation and Instructions & Packing Check-List", TracRac , Fall River, MA, 1 page (2000).
Article—TracRac, "Packing Check List", TracRac , Fall River, MA, 2 pages (1998).
Article—TracRac, "The Ultimate Sliding Truck Rack System", TracRac , Fall River, MA, 1 page.
Article—TracRac, "The Ultimate Sliding Truck Rack System-", TracRac , Fall River, MA, 11 pages (1998).
Article—TracRac, "The Ultimate Van Rack", TracRac , Fall River, MA, 1 page.
Article—TracRac, "TracRac Retail Pricing", TracRac , Fall River, MA, 1 page.
Article—TracRac, "TracRac Utility Rack Retail Pricing", TracRac , Fall River, MA, 1 page.
Article—BCR, Inc, Building Specialties, Aickinstrut Structures and Fasteners, Aickinstrut, Inc., pp. A-D.
Article—B-Line Systems Inc., "Strut Systems", Engineering Catalog, pp. 1-176.
Article—CargoGear, Internet Catalog Sale Receipt, Saris Corporation, Tucson , AZ, 1 page (2000).
Article—Gold Series 5th Wheel Tool Boxes by DeeZee, TruckStuff USA, http://www.truckstuffusa.com/dee91758.html; Jul. 27, 2000, 1 page.
Article—Midland-Ross Corporation, "Superstrut—The Complete Line. One Source.", Superstrut Division, Oakland, CA, 1 page.
Article—Platinum Series LB Topsider Tool Box by DeeZee, TruckStuff USA, http://www.truckstuffusa.com/dee68.html; Jul. 27, 2000, 1 page.
Article—SystemOne Modular Truck Equipment, Christensen Manufacturing, http:www.christensenmfg.com/; Jul. 27, 2000, 1 page.
Article—TracRac, "Dear Customer", TracRac , Fall River, MA, 1 page.
Article—Unistrut Los Angeles, "Unistrut framing systems for Maintenance Supervisors, Design Engineers, Plant Engineers", pp. 1-31.
Article—Unistrut, General Engineering Catalog, pp. 1-126.
Brochure—Hi-Lift® The Original Jacks, Bloomfield Manufacturing Co., Inc., 2001, cover page, pages 6 and 7.
Dialog File 226; U.S. Trademark registrations 1,824,078; 1,613,372 and 828,807, "Slide-N-Lock".
Ringbolts, Tie Down Rings & Pad Eyes; printed Aug. 1, 2005; http://www.mcmaster.com.

* cited by examiner

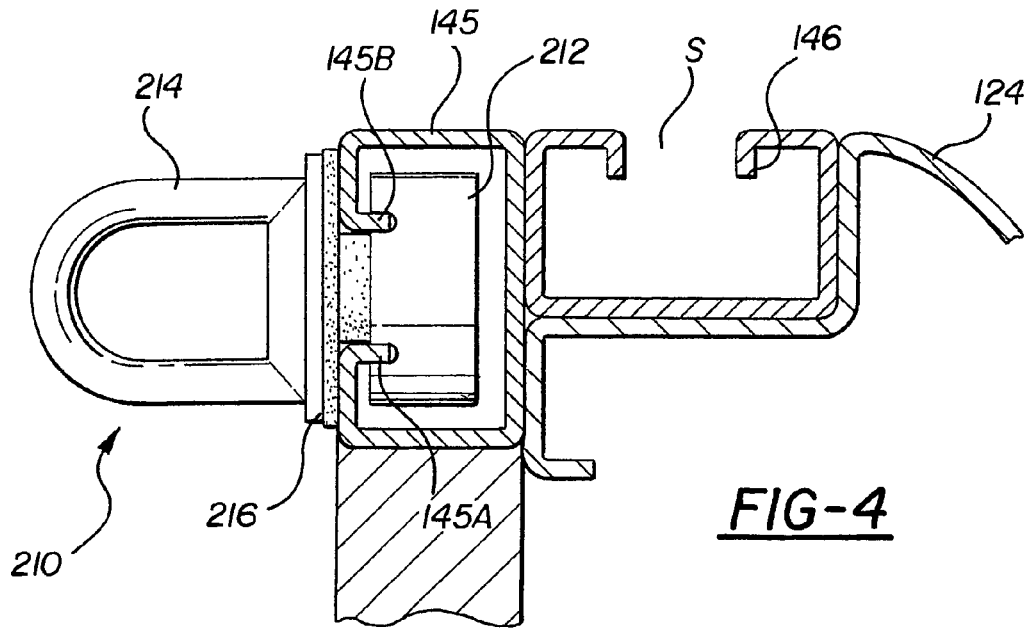
*FIG-4*
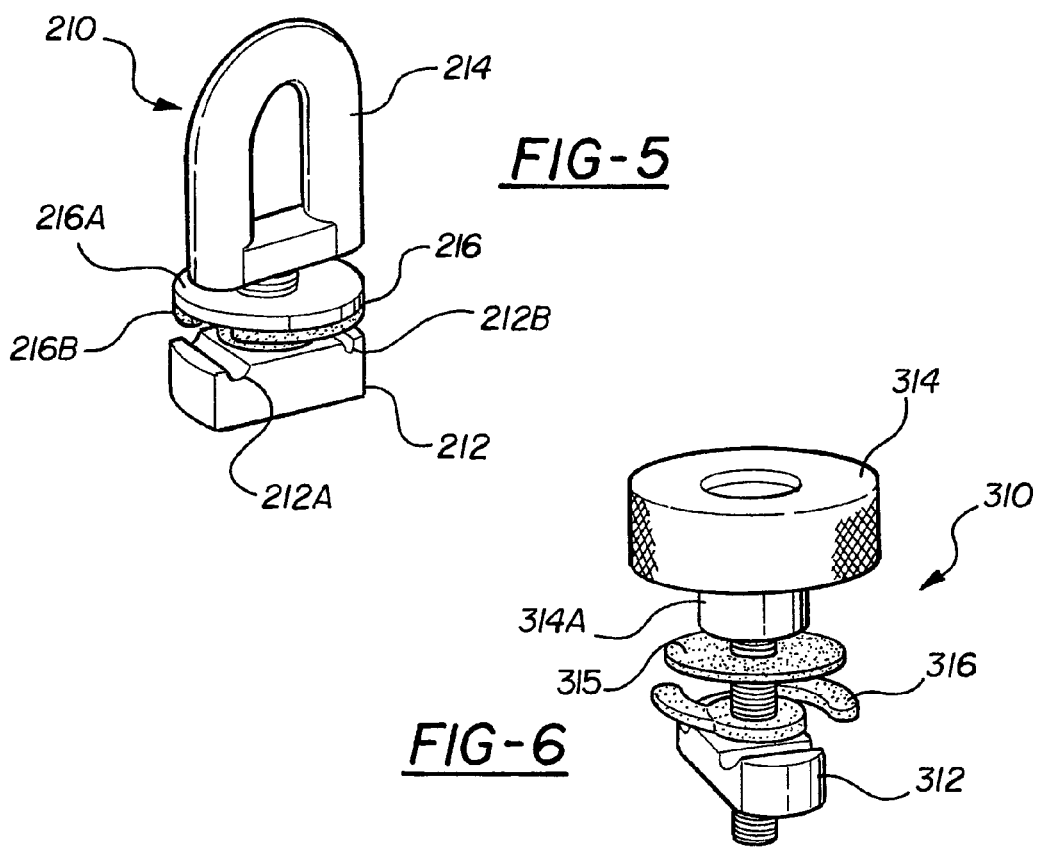
*FIG-5*
*FIG-6*

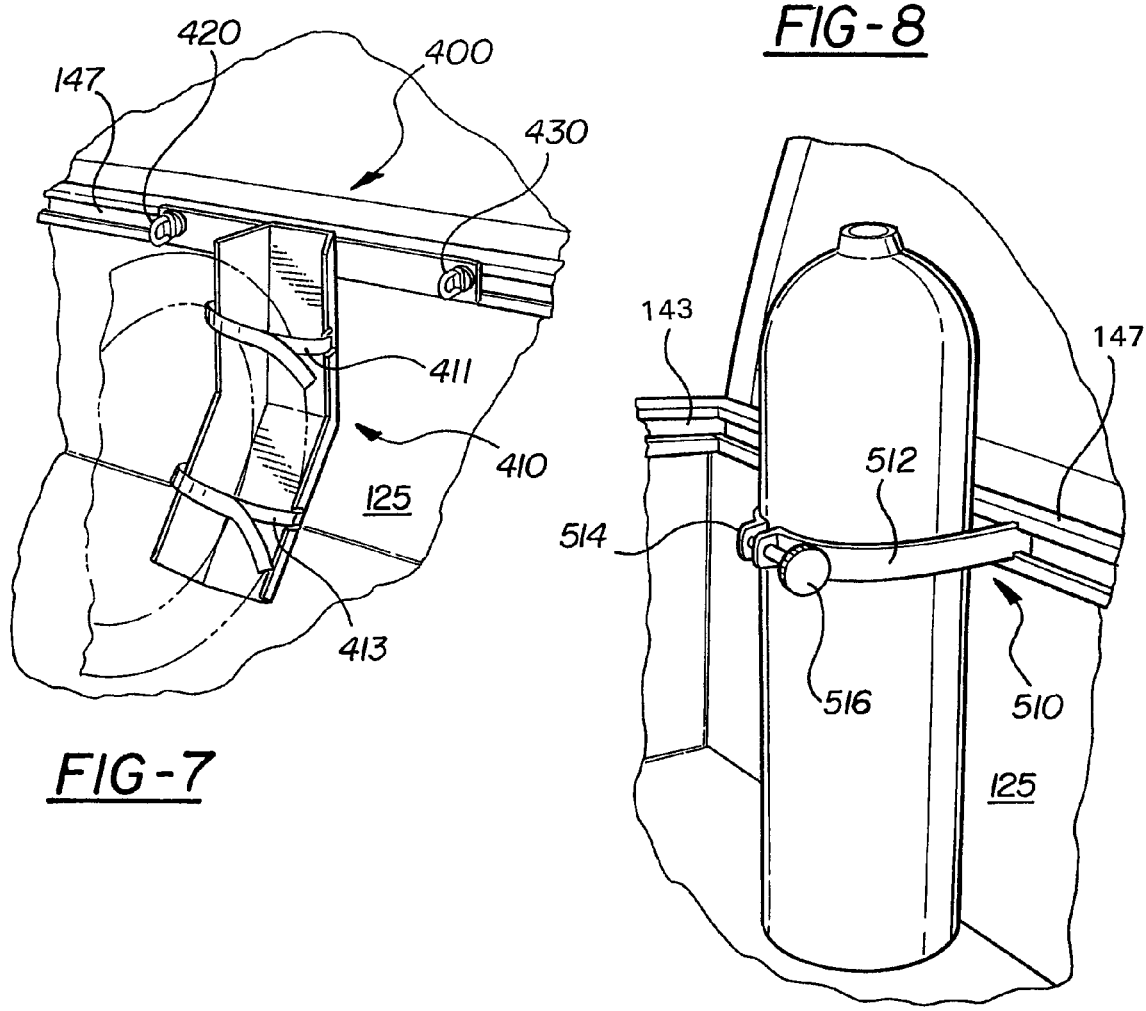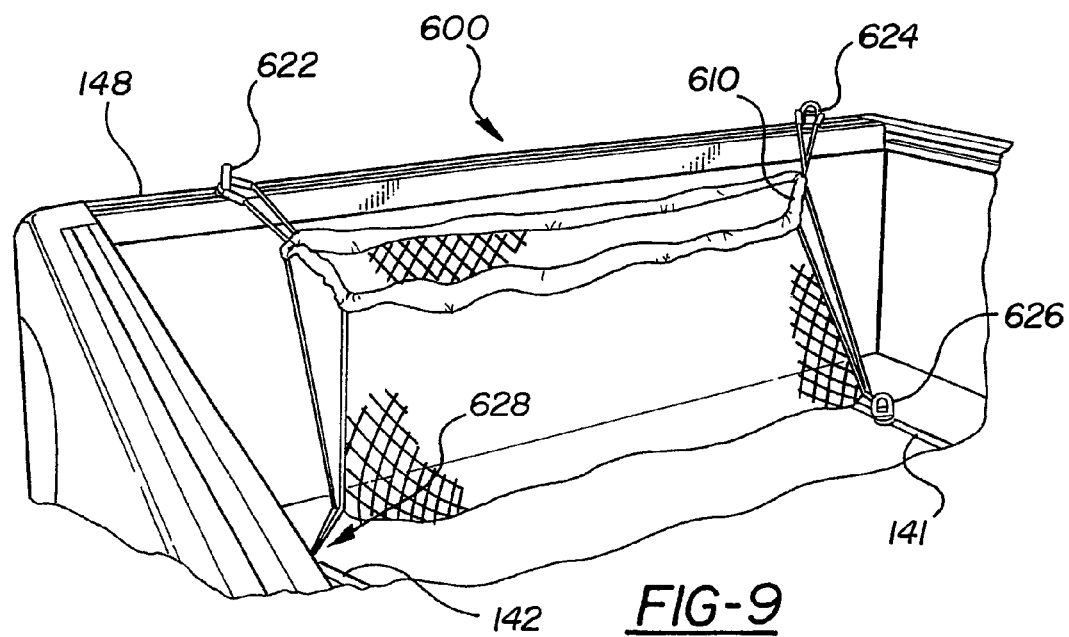

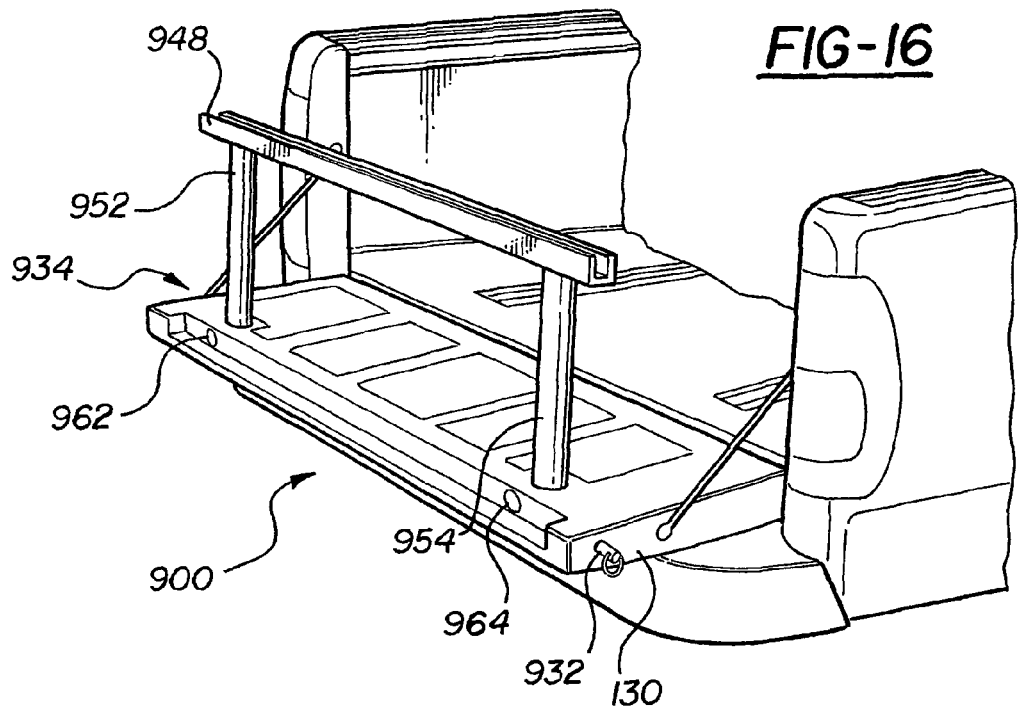
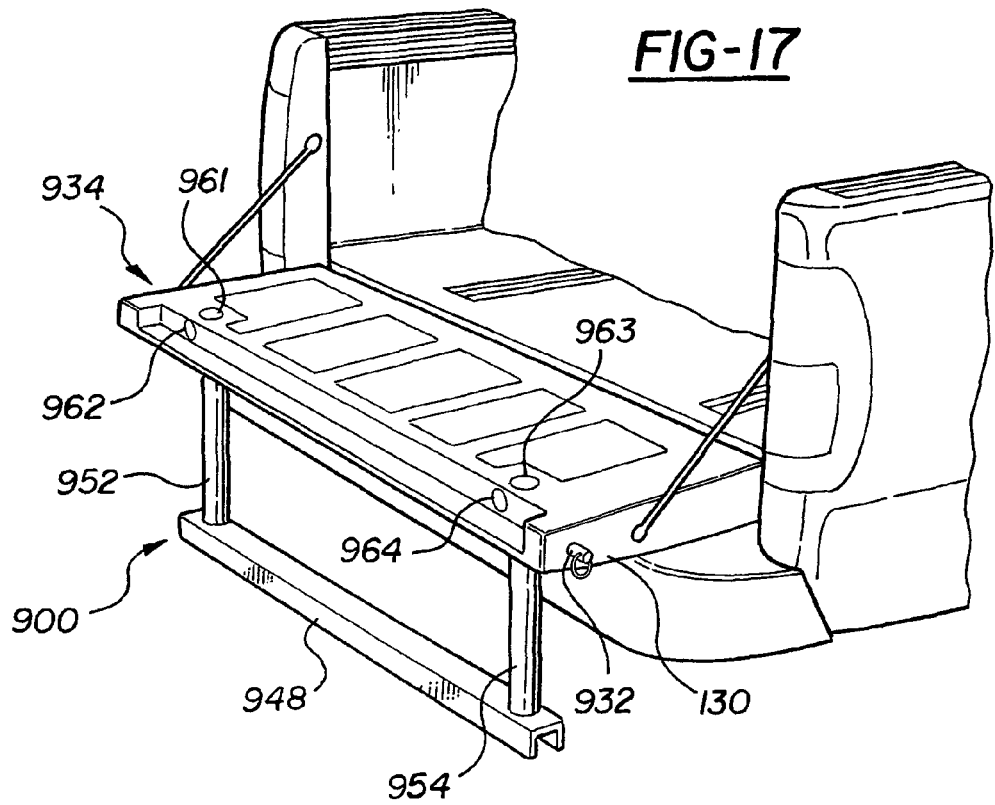

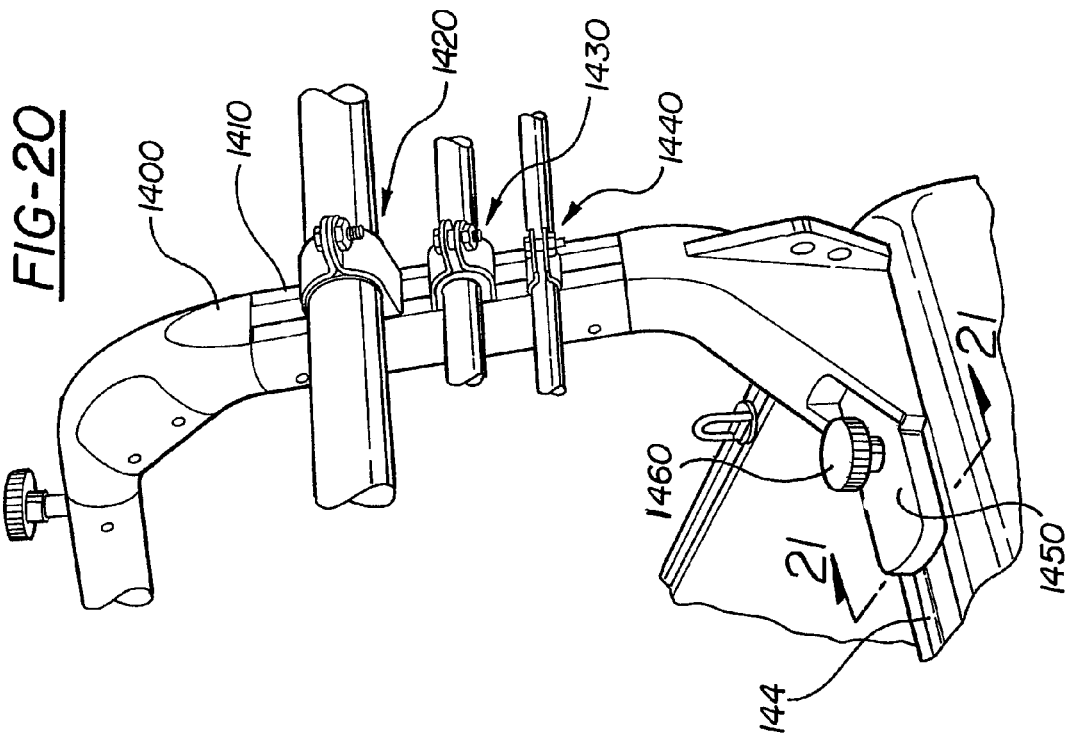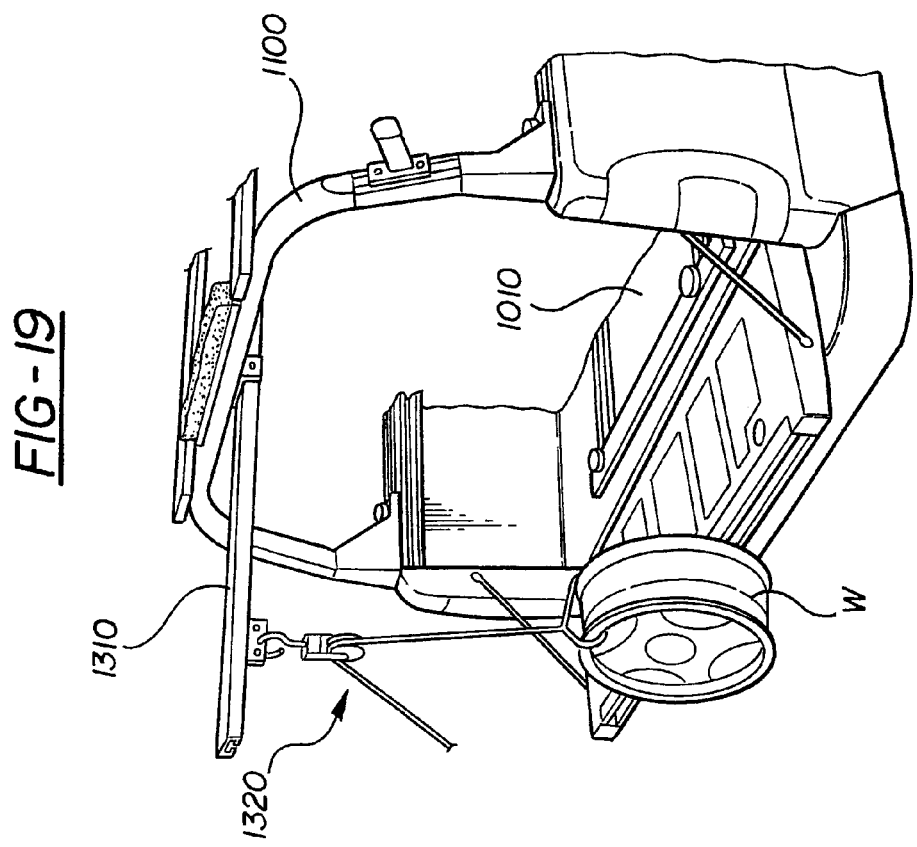

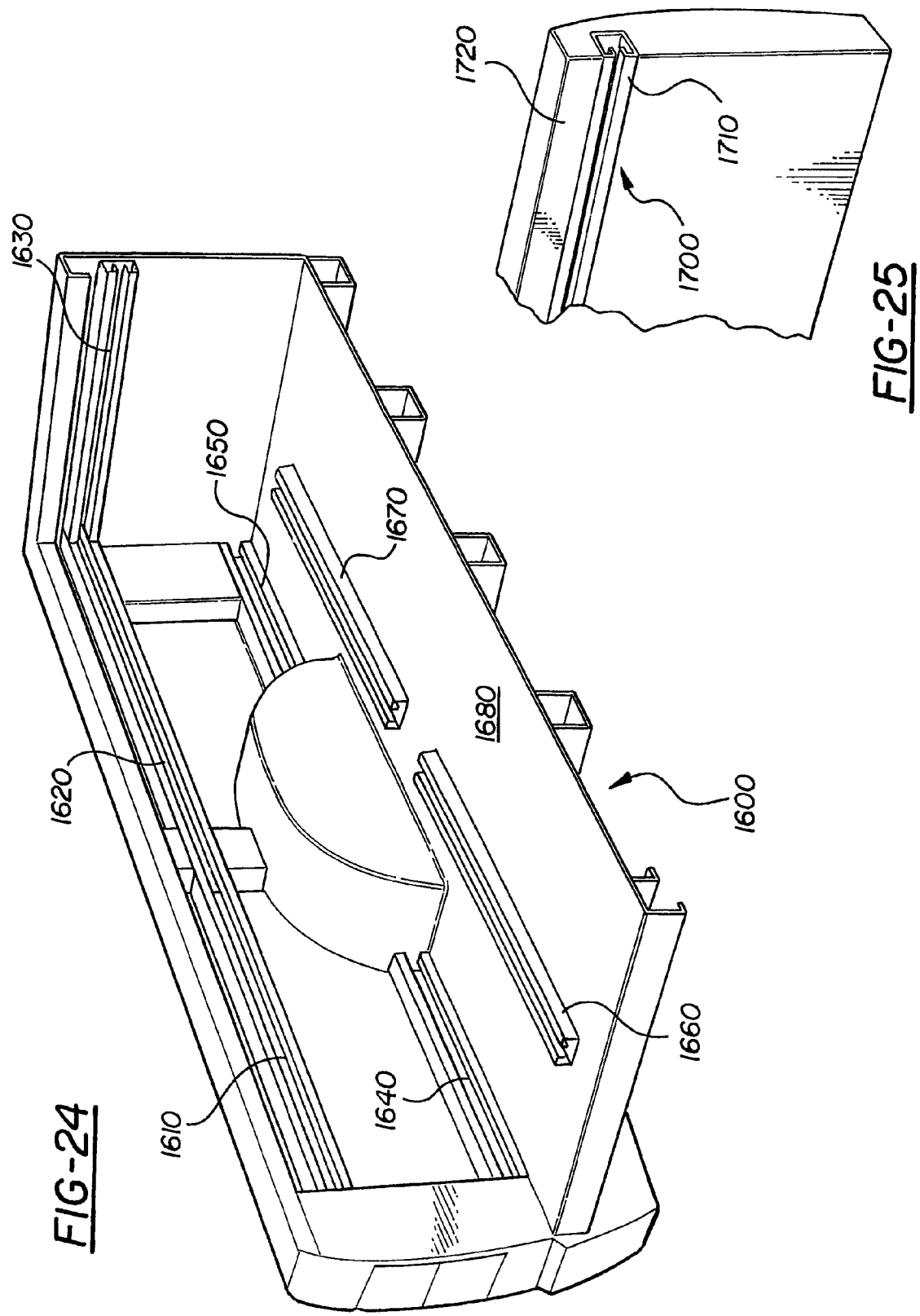

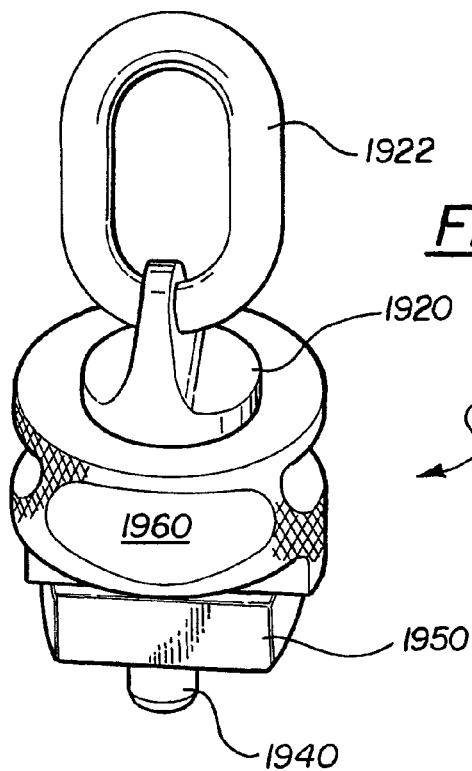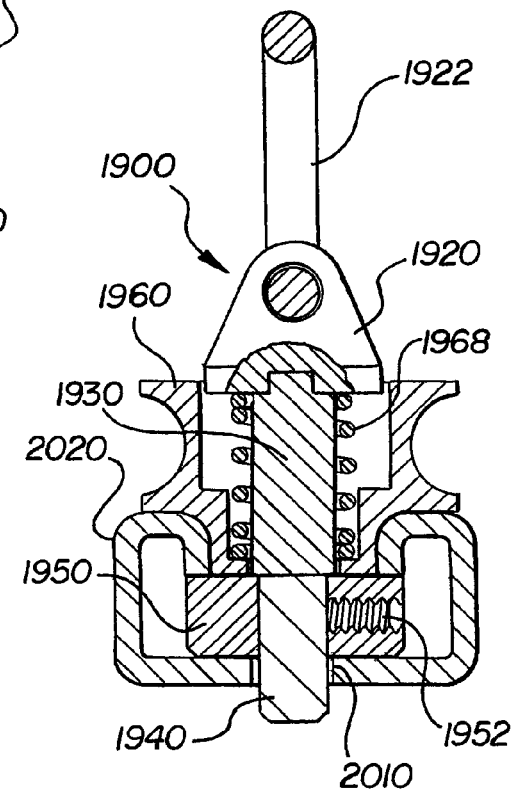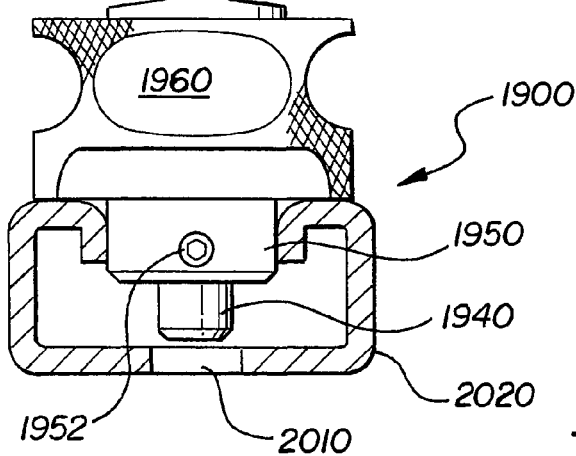

FLEXIBLE TRUCK BED TIE-DOWN SYSTEM

The present application is a continuation of U.S. application Ser. No. 11/030,140, filed Jan. 7, 2005 and now U.S. Pat. No. 7,281,889, which is a divisional of U.S. application Ser. No. 09/874,979, filed Jun. 7, 2001 and now U.S. Pat. No. 6,846,140, which in turn claims benefit of priority to U.S. Provisional Application Ser. No. 60/242,724, filed Oct. 25, 2000. The entire contents of both of these applications are incorporated herein by reference. The present invention relates generally to the field of trucks. More specifically, the present invention relates to a flexible tie-down system for trucks.

FIELD OF THE INVENTION

Background of the Invention

The explosion in the popularity of pick-up trucks and/or sport utility trucks (SUTs) has fueled a proliferation of new body configurations. Trucks are offered as standard cabs, king cabs, crew cabs, SPORT TRACS, and the like. Likewise, truck interiors have been adapted to meet the needs for more comfort, more passenger capacity, and the like. One area of the pick-up truck that has yet to undergo a similar evolution is the cargo bed itself.

It is ironic that the most utilitarian element of what is essentially a utilitarian vehicle is, in practical terms, not especially useful. As currently conceived, the standard full-sized pick-up bed is little more than a large empty volume with a few tie-down points scattered along the perimeter of its interior walls or along a bed rail. There is an enormous opportunity to improve the utility and ease of use of a truck bed.

Some trucks are used primarily for work and others primarily for recreation. Many trucks do double-duty supporting both of these spheres of activity. One of the most glaring deficiencies of current bed design is that they are not readily adaptable to the wide variety of applications required by the end user. A truck bed should be able to support and accommodate the very different requirements that are associated with a diverse range of activities.

Generally speaking, bed usage may be grouped into three broad categories: hauling, securing, and separating items in the payload. Most truck users need to perform each of these tasks with some frequency. Yet the demands placed on the bed for hauling are significantly different from those needed to secure or separate items in and around the bed.

When hauling yard waste, plywood, recreational gear, and other items, the ideal condition is to maximize the interior volume of the bed and to maintain an easily accessible loading surface. When securing individual objects in the bed, such as dirt bikes, ATVs, air tanks, furniture, and other items, the ideal condition is to have multiple sturdy tie-down points in close proximity to the object being secured. When hauling and securing combinations of items—heavy objects and fragile equipment, for example—it becomes necessary to separate these items from one another.

This situation has led to a brisk business in after-market systems created by after-market manufacturers. However, while many of these systems are at least partially effective, they are not necessarily designed to interface with the truck in an optimum manner from a functional, structural, and aesthetic standpoint.

SUMMARY OF THE INVENTION

An object of the invention is to provide a truly flexible cargo bed tie-down system that allows the user to easily change, adjust, customize, and adapt his or her vehicle to specific needs at any given moment, and that interfaces with the rest of the truck in an optimum manner from a functional, structural, and aesthetic standpoint.

One embodiment of the invention provides a vehicle comprising a side wall construction enclosing a cargo bed at a side of the cargo bed. The side wall construction includes an outer portion which runs generally vertically at an outer portion of the vehicle, and a top portion which runs generally horizontally from the outer portion toward a longitudinal center of the vehicle. A tie-down rail is mounted adjacent to the top portion such that a part of the top portion overhangs at least a portion of the tie-down rail. The tie-down rail is configured to accept a tie-down fitting and includes a slotted opening generally aligned with an interior edge of the top portion. This permits tie-down rail(s) (also called track(s)) to blend in with the truck, which improves functionality. This is in contrast to currently available after-market products. Such after-market products and existing trucks are not necessarily designed to interface in an optimum manner, from a functional, structural and aesthetic standpoint.

BRIEF DESCRIPTION OF THE DRAWINGS

The invention will be described in further detail below in conjunction with the following drawings:

FIG. 4 is a sectional view of plane 4-4 of FIG. 1 (with a tie-down fitting installed).
FIG. 5 illustrates an example of a tie-down fitting.
FIG. 6 illustrates another example of a tie-down fitting.
FIG. 7 illustrates an example of a tire cradle.
FIG. 8 illustrates an example of a tank fitting.
FIG. 9 illustrates an example of a cargo net arrangement.
FIGS. 14 through 17 illustrate an example of a tailgate extender, having a track, in four different positions.
FIG. 19 illustrates an example of a pulley arrangement supported by the crossbar members.
FIG. 20 illustrates one possible configuration of a track and fittings on a crossbar member.
FIG. 24 is an example of another arrangement of tracks, according to the invention.
FIG. 25 is an example of another arrangement of a track, according to the invention.
FIGS. 27 through 31 illustrate a type of fitting that may be used according to the invention.

DETAILED DESCRIPTION OF PREFERRED EMBODIMENTS

Figure 1:
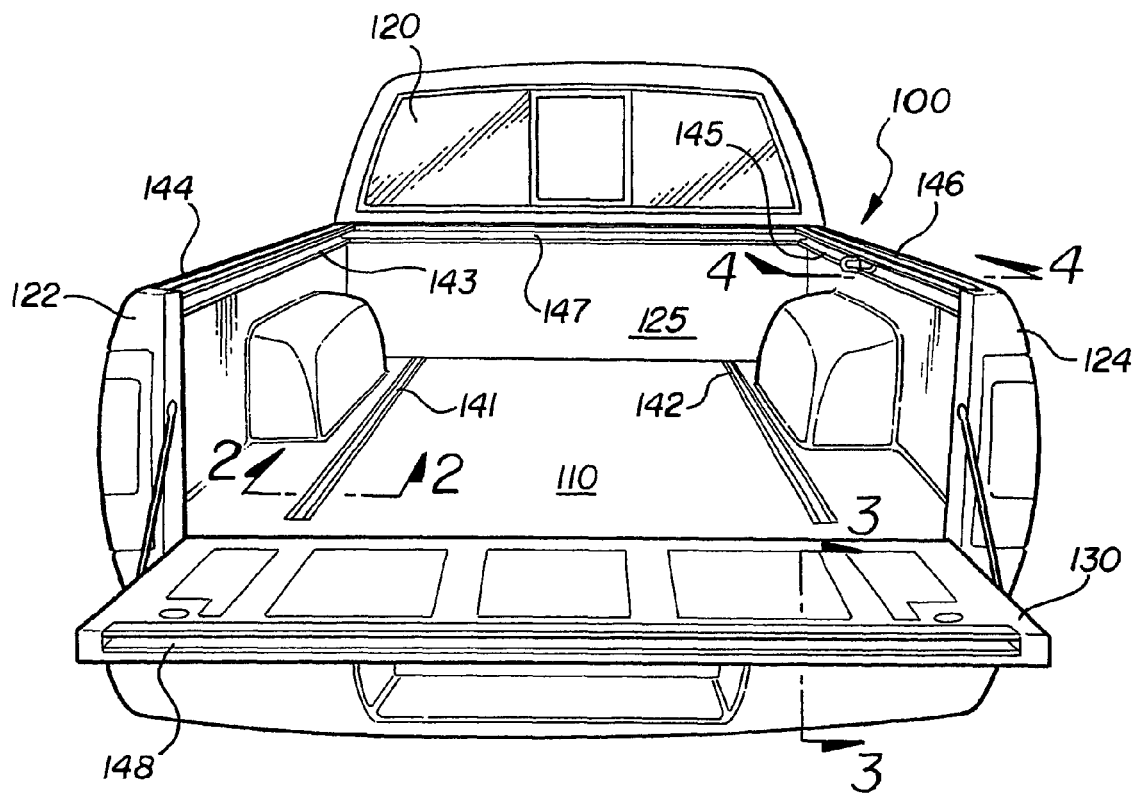
FIG. 1 is an end view of a truck embodying the invention.

FIG. 1 illustrates an end view of a truck 100 configured in accordance with one embodiment of the invention.

As shown in FIG. 1, the truck 100 has a cargo bed, or area, 110 behind a cab (or passenger compartment) 120. There are two sidewalls 122, 124 on the sides of bed 110 and front wall 125. In this particular configuration, the truck 100 also includes a tailgate 130. Tracks 141 and 142 are located in bed 110. The left sidewall 122 has a track 143 which opens inward and another track 144 which opens upward. Similarly, sidewall 124 has an inward facing track 145 and an upward facing track 146. A rearward facing track 147 is located on front wall 125 behind cab 120, and the free end of tailgate 130 includes a track 148.

Figure 2:
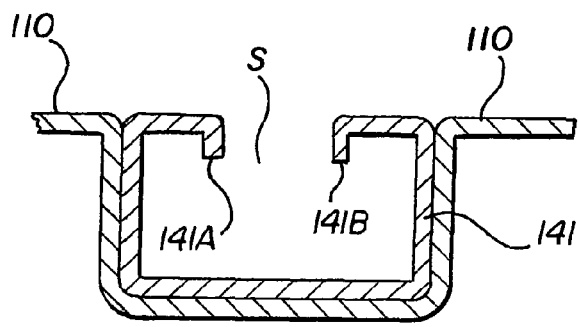
FIG. 2 is a sectional view of plane 2-2 of FIG. 1.

FIG. 2 is a sectional view of plane 2-2 of FIG. 1. FIG. 2 illustrates track 141 recessed in bed 110. The track 141 is in the shape of a channel and has two inward turning lips 141A and 141B. The track 141 is provided with a slot opening S. The design of track 142 (with respect to bed 110) is similar to the design of track 141.

Figure 3:
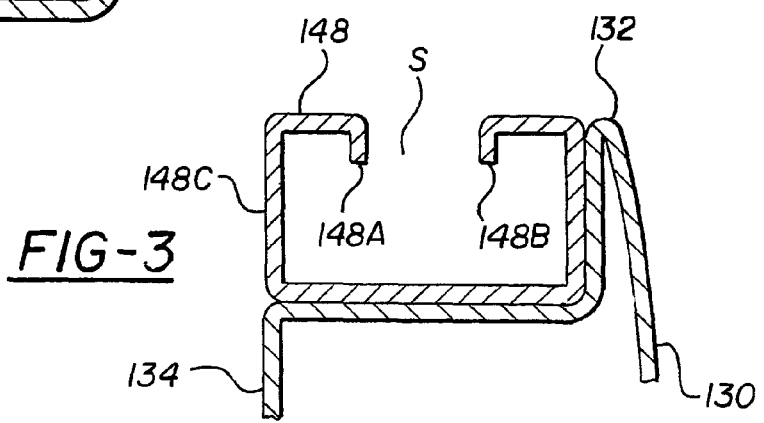
FIG. 3 is a sectional view of plane 3-3 of FIG. 1.

FIG. 3 is a sectional view of plane 3-3 of FIG. 1. As shown in FIG. 3, track 148 is located on the free end of tailgate 130. Track 148 has inward turning lips 148A and 148B and a slot opening S.

FIG. 4 is a sectional view of plane 4-4 of FIG. 1, with a tie-down fitting installed. As illustrated, track 145 faces inward and track 146 faces upward. The design of tracks 145 and 146 is similar to the design of tracks 141 and 148, as discussed above. Similarly, tracks 143 and 144 are similar to tracks 145 and 146.

An important feature of the invention is that the tracks are outside of the passenger compartment (in the FIG. 1 embodiment the tracks are behind the passenger compartment). This allows the storage of larger, heavier loads. Another important feature of the invention is that the tracks 141 to 148 are integral with the body of truck 100 such that the exterior contours of the tracks do not extend appreciably beyond the contour of adjacent portions of the body (e.g., not more than ⅛, ¼, ½, or ¾ inch beyond the contour of adjacent portions of the body).

For example, the exterior contour of track 141 is flush with cargo bed 110. In FIG. 3, the upper horizontal surface of track 148 is flush with the uppermost portion 132 of tailgate 130 and the surface 148C of track 148 is flush with the surface 134 of tailgate 130. Similarly, as shown in FIG. 4, the exterior contours of tracks 145 and 146 do not extend appreciably beyond the contour of adjacent portions of the body.

This design permits the tracks to blend in with the body of the truck, which improves functionality because the tracks do not obstruct placement of items into or on the truck. Also, in the invention, the portions of the body of the truck that support the tracks are specifically designed to accommodate the tracks and to take large loads, which thus allows the tracks to support or secure large loads. As discussed above, this is in contrast to currently available after-market products which sit on top of the body of the truck. Such after-market products and existing trucks may not necessarily be designed to accommodate each other in an optimum manner, from a structural viewpoint.

The contour of the adjacent portions of the body of the truck can be formed by, for example, structural steel, aluminum and other material that forms part of the structural part of the body, sheet metal, sheet aluminum or other material, and/or plastic (either separate or with a track encapsulated). The track slots can be pointed in any direction, for example, upward, downward, outboard, inboard, rearward, forward, or at an angle. Also, when the tracks are not in use, the tracks can be covered with a protective strip of, for example, rubber or plastic, which fits into the slot opening.

In this particular embodiment of the invention, the geometry of the tracks is similar to the geometry of channels manufactured for industrial framing applications (for example for supporting pipes and electrical lines). This allows a user to employ a wide variety of commercially available fittings to customize and adapt the tie-down arrangement to the particular task at hand.

FIGS. 4 and 5 illustrate an example of a tie-down fitting 210. Fitting 210 may be used with rope, straps, and the like to secure items in and/or to the bed. This fitting 210 has three separate parts, a nut 212 available from (for example) the manufacturers listed below, a male threaded commercially available eye 214, and a washer 216. The nut has two grooves 212A and 212B that are intended to mate with the in-turned lips of the track (such as lips 145A and 145B of track 145). In this embodiment, washer 216 has a metal portion 216A and an elastic portion 216B. This fitting can be moved anywhere along a track and then fixed in a desired location. The fitting can also be released from the track, for example, by twisting or unscrewing the fitting and then removing the fitting in a direction approximately perpendicular to the track. Providing fittings that can be inserted anywhere along the track and that are movable within the track allows the user to customize and adapt the truck to the task at hand by providing the appropriate number and spacing of fittings required for the task at hand. Also, because the fittings are releasable, they can be removed when not needed, so that they do not become an obstruction.

To use the assembly, the nut 212 is placed into the channel (or track), the washer 216 is placed on a threaded part of the eye 214, and then the nut 212 is turned 90 degrees such that the grooves 212A, 212B in the nut mate with the in-turned lips 145A and 145B of the channel. Then, the eye is screwed into the nut until tight. This squeezes the track between the nut and the washer/eye assembly. The pressure locks the entire assembly to the track. The fitting is removed by loosening the nut/eye assembly, and turning the nut 90 degrees.

FIG. 6 illustrates another example of a tie-down fitting 310. This fitting 310 can be used for securing a wide variety of items to a track. As shown in FIG. 6, fitting 310 includes a commercially available nut 312, a knob portion 314, a plastic or steel washer 315, and a washer 316. A contact portion 314A of knob 314 is designed to hold an object between contact portion 314A (and washer 315) and a track. The washer 316 is bonded to the nut 312 and rests on top of the track to keep the nut from falling into the track. An example of use of such a fitting will be described in further detail below in conjunction with FIGS. 10, 20 and 21.

FIG. 7 illustrates an example of a specialized fitting 400 having a tire cradle 410 for use with the track system described above. This fitting 400 can be positioned and then secured, for example, to track 147 on front wall 125 behind the cab using fittings 420 and 430. Fittings 420 and 430 are similar to fitting 210, described above. Two straps 411 and 413 are used to secure a tire within the cradle 410. This tire cradle can be used with the other fittings described in this patent specification to provide numerous tie-down points to stabilize, for example, a mountain bike or motorcycle, within the cargo bed.

It will be appreciated that the fittings described in this patent specification can be used in conjunction with, for example, ropes, straps, rubber tie-downs, and the like, to secure objects to tie-down points throughout the cargo bed.

FIG. 8 illustrates an example of a tank fitting 510 for use, for example, with the side tracks described above. Fitting 510 includes two commercially available bands 512 and 514 which are approximately in the shape of a quarter circle. The bands are joined at one end by a tightening assembly, such as a threaded knob 516. The other ends of the bands are shaped to lie within one of the tracks (for example, track 145, as shown in FIG. 8). Such fittings allow adjustable and secure placement of, for example, scuba tanks, and the like, near the bed perimeter.

FIG. 9 illustrates an example of a cargo net arrangement 600. Arrangement 600 includes a cargo net 610 which is secured to tracks 141, 142, and 148 using fittings 622, 624, 626, and 628. Fittings 622, 624, 626, and 628 are similar to fitting 210, shown in FIG. 5.

Figure 10:
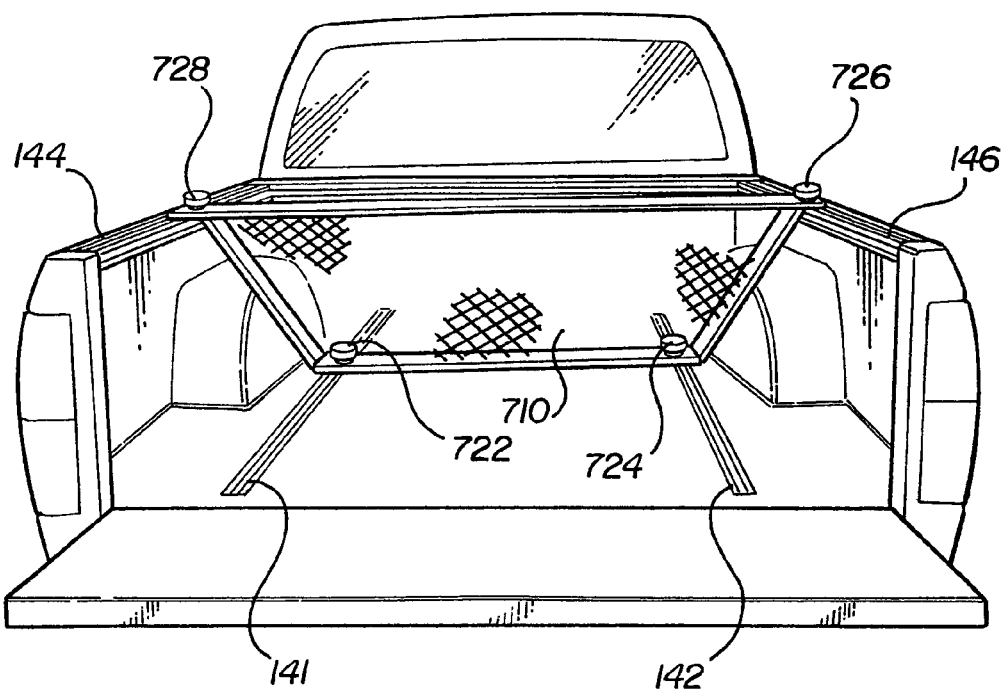
FIG. 10 illustrates an example of a cargo divider.

The tracks at the side of the bed and/or the tracks at the bottom of the bed, can also be used to secure a cargo divider, as shown in FIG. 10. FIG. 10 illustrates a cargo divider 710 secured to tracks 141, 142, 144, and 146 using fittings 722, 724, 726, and 728. Fittings 722, 724, 726, and 728 are similar to fitting 310, shown in FIG. 6.

Figure 11:
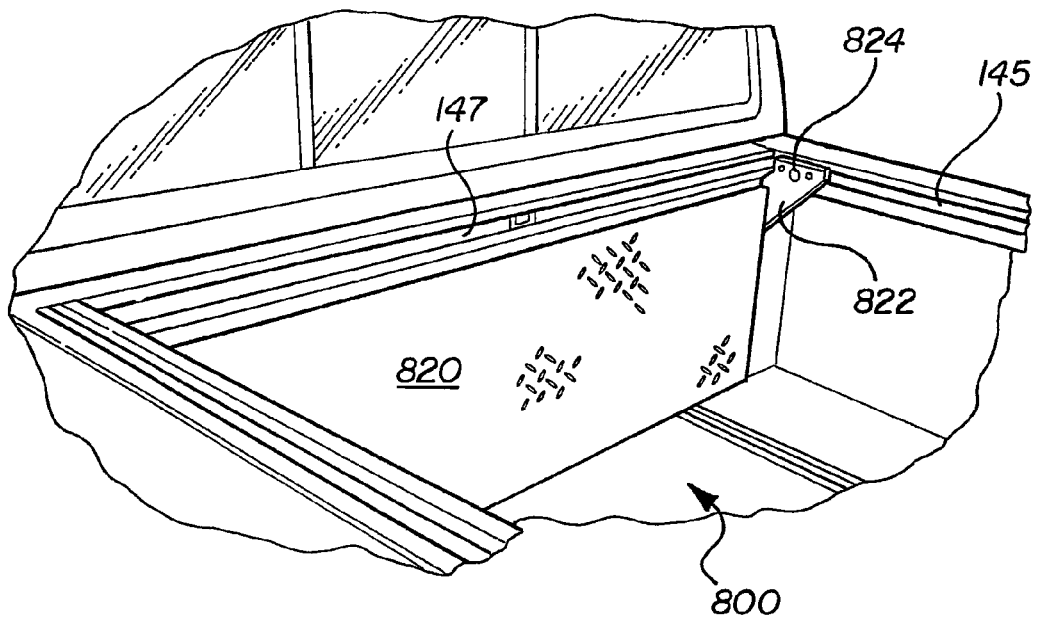
FIG. 11 illustrates an example of a foldable storage box in a stored position.
Figure 12:
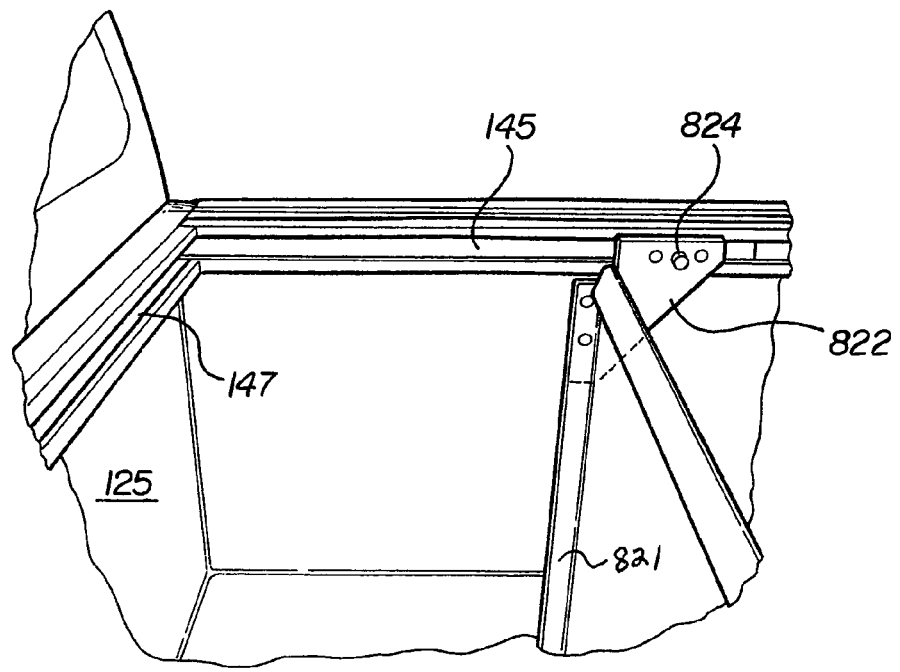
FIG. 12 illustrates the foldable storage box being placed in the storage position.
Figure 13:
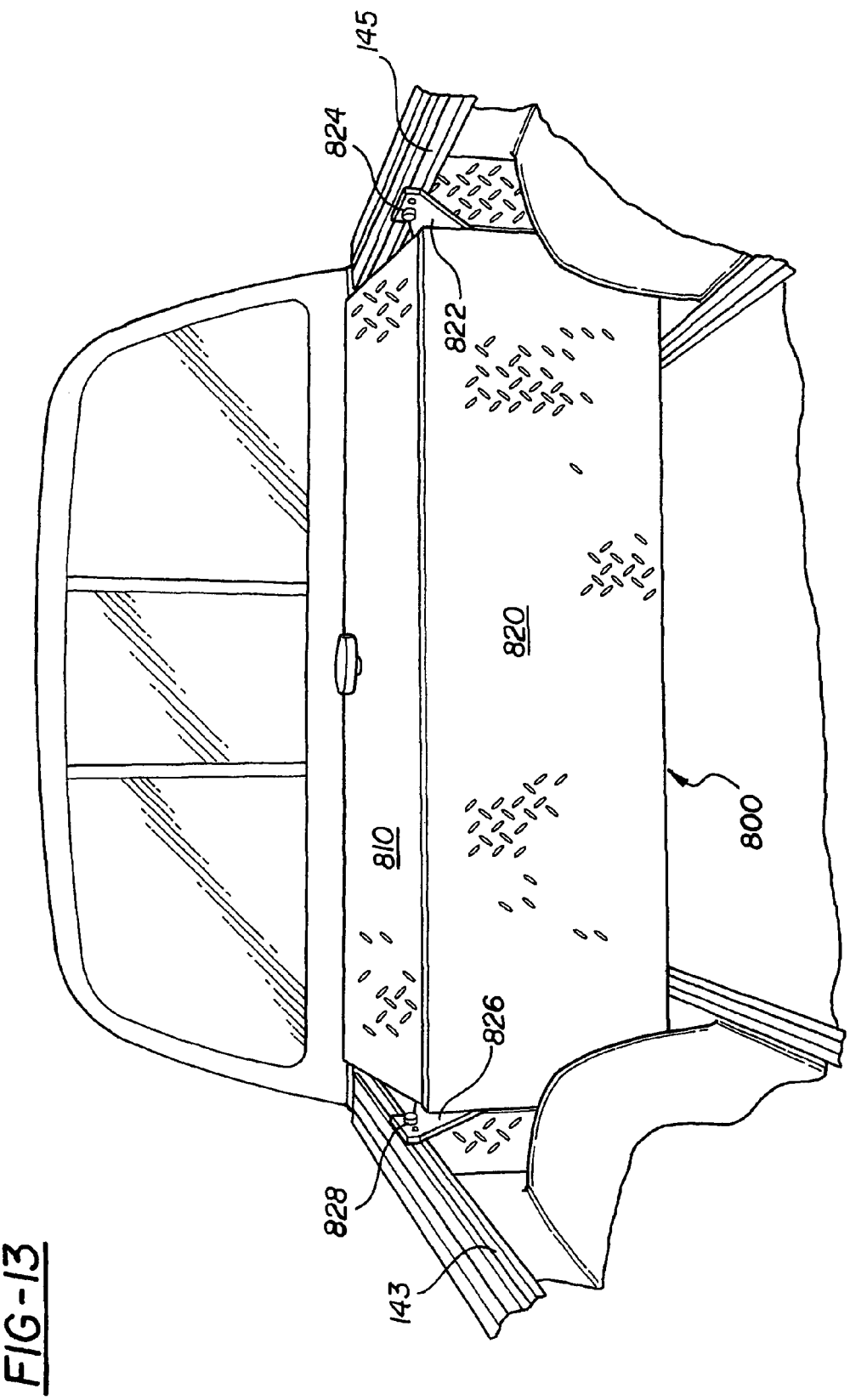
FIG. 13 illustrates the foldable storage box in the storage position.

FIGS. 11 to 13 depict a folding/stowable box arrangement 800 which is provided by the invention. FIG. 11 illustrates an example of the box in the storage position. When not in use, a lid 810 of the box and a rear side 820 of the box are folded together and are stored flat against the front wall 125 of the cargo bed to maximize bed space, as shown in FIG. 11 (in FIG. 11, the lid 810 is hidden behind the side 820). When the user desires to place the box in the storage position, both the lid 810 and the rear side 820 are moved rearward using fittings 822 and 826 to guide the side 820 and maintain the side 820 approximately perpendicular to the cargo bed. Then, knobs 824 and 828 are tightened to secure fittings 822 and 826 to tracks 145 and 143. Then, lid 810, which is stored in slots 821 of side 820 (lid 810 is not shown in FIG. 12 in order to show slot 821 clearly), is pivoted, for example by a hinge, to cover the interior of the box, as shown in FIG. 13.

Figure 14:
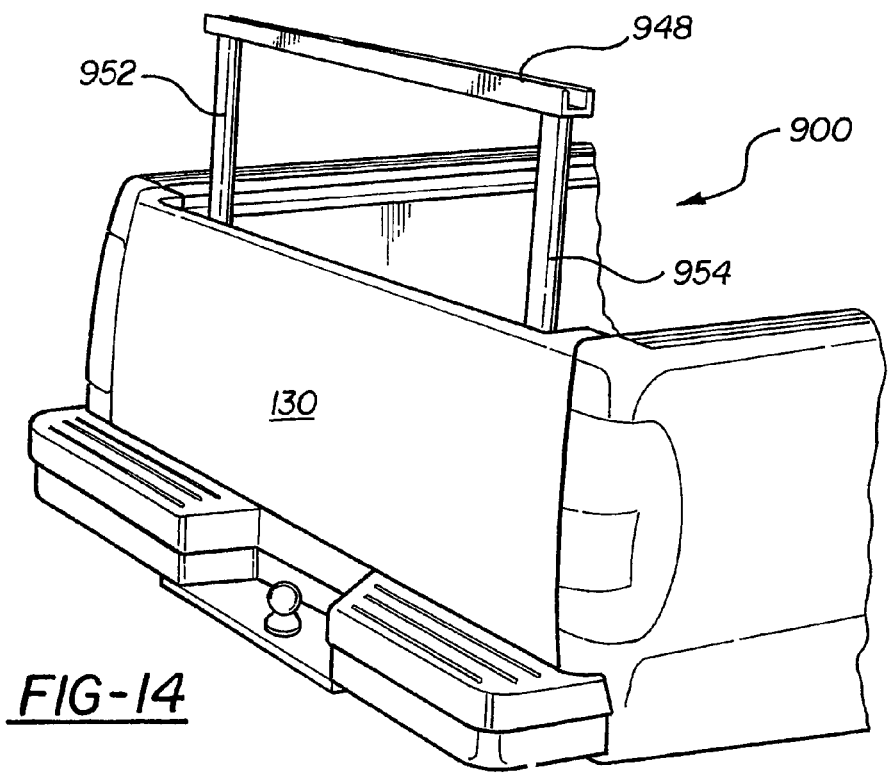
Figure 15:
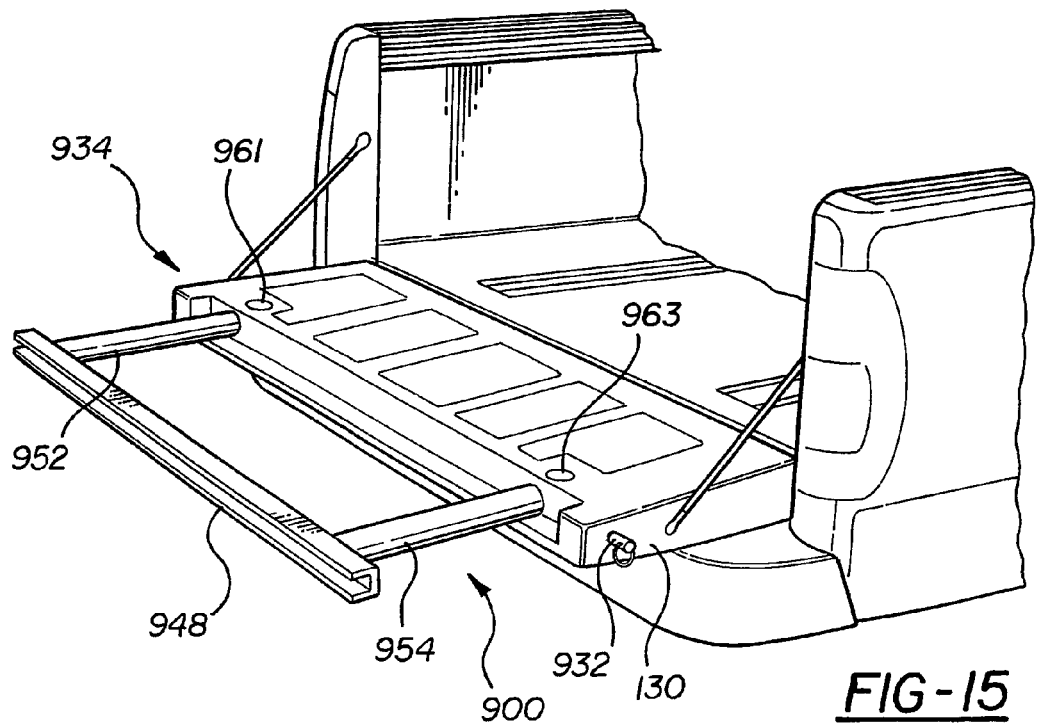

FIGS. 14 through 17 illustrate an example of a tailgate extender 900, having a crossbar member 948, in four different positions. As shown in these figures, the tailgate 130 is positionable such that the primary plane of the tailgate 130 is either vertical (FIG. 14) or horizontal (FIGS. 15 to 17). Crossbar member 948 runs in a direction perpendicular to the longitudinal direction of the truck. A first member 952 and a second member 954 are connected to the crossbar member 948. The first member 952, the second member 954, and the crossbar member 948 lie in the same plane. A connection assembly (to be described below) connects the crossbar member 948 to the tailgate 130 via at least the first and second members 952 and 954 such that:

(1) the first member 952, the second member 954, and the crossbar member 948 lie in the primary plane of the tailgate 130 to act as an upright for loads when the tailgate 130 is vertical (as shown in FIG. 14);

(2) the first member 952, the second member 954, and the crossbar member 948 lie in the primary plane of the tailgate 130 to act as an extension of the tailgate 130 for longer loads when the tailgate 130 is horizontal (as shown in FIG. 15);

(3) the first member 952, the second member 954, and the crossbar member 948 lie in a plane perpendicular to the primary plane of the tailgate 130 to act as an upright (or rear support) when the tailgate is horizontal (as shown in FIG. 16); or (4) the first member 952, the second member 954, and the crossbar member 948 lie in a plane perpendicular to the primary plane of the tailgate 130 to act as a step when the tailgate 130 is horizontal (as shown in FIG. 17). (Also, the tailgate extender can be positioned as shown in FIG. 17, except with the tailgate closed, to provide another configuration, for example, for storing long objects.)

The first and second members 952 and 954 can be stored within the tailgate 130 by pushing them into the tailgate (in which case the crossbar member 948 simply acts as a track on the free end of the tailgate similar to track 148 in FIG. 1). The first and second members 952 and 954 are secured to the tailgate 130 in one of the three relative positions by: (1) sliding the first and second members 952 and 954 into one pair of holes 962 and 964 which are parallel to the primary plane of the tailgate and securing the members by pins 932 and 934; or (2) sliding the first and second members 952 and 954 into one pair of holes 961 and 963 which are perpendicular to the primary plane of the tailgate 130 and securing the members by pins 932 and 934. Pins 932 and 934 go through holes in tailgate 130 and members 952 and 954.

Figure 18:
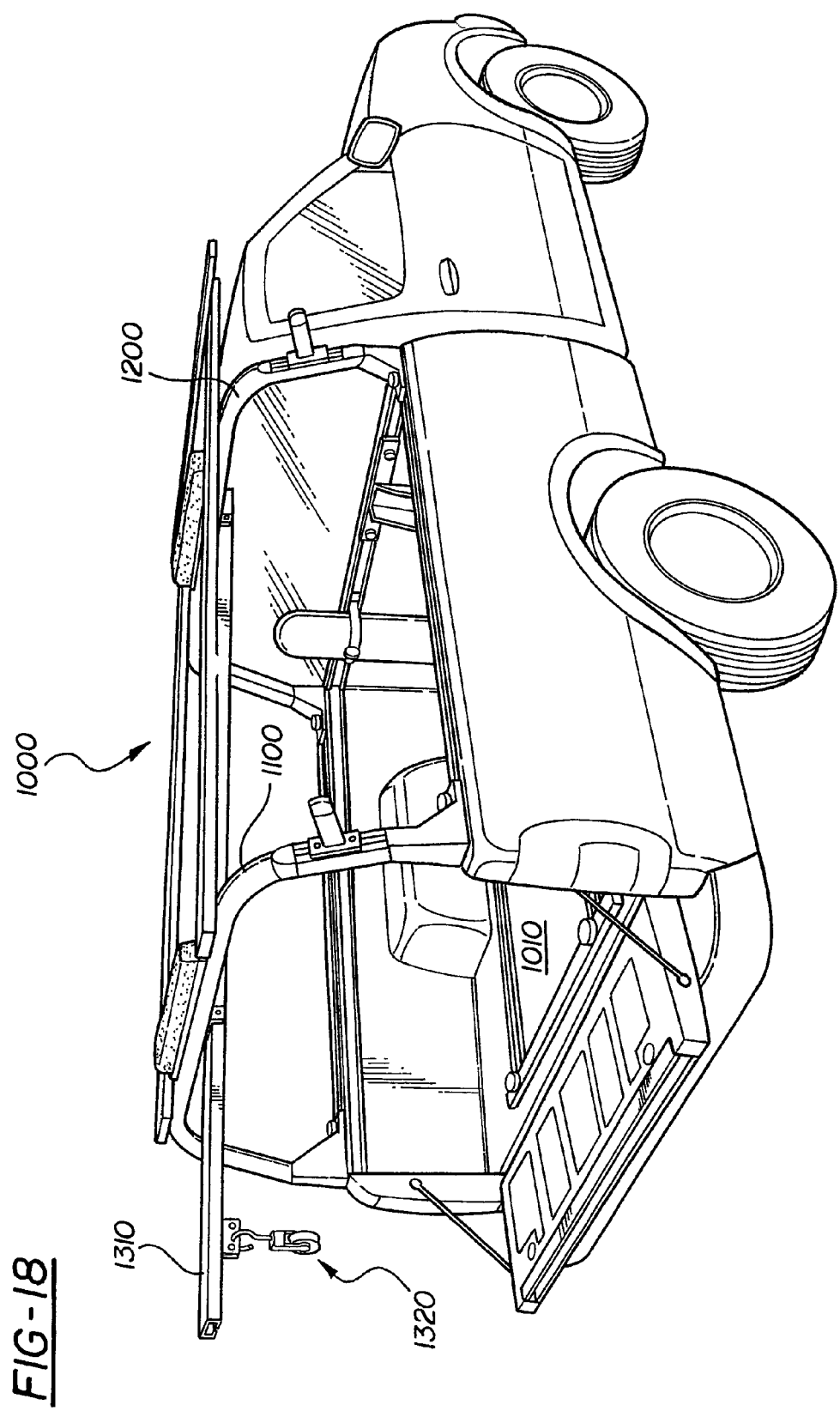
FIG. 18 illustrates an example of an arrangement of crossbar members.

FIGS. 18 and 19 illustrate an example of an arrangement 1000 of crossbar members 1100 and 1200 that can be used to support, for example, ladders, plastic pipe, a large sea kayak, and other long objects. These crossbar members allow the cargo bed 1010 to be free for other gear. In addition, the longitudinal spacing of the crossbar members 1100 and 1200 can be adjusted to secure tall objects (such as appliances) between the crossbar members. (One way of securing such crossbar members to the tracks will be described below in connection with FIGS. 20 and 21.)

The crossbar members 1100 and 1200 can support, for example, a beam 1310 that can be cantilevered near the rear end of the truck to support a pulley system 1320. FIG. 19 illustrates an example of pulley system 1320 being employed to easily load a heavy, awkwardly-sized object (wheel W) into the cargo bed 1010. In one variation, upward facing tracks 144 and 146 may be eliminated and crossbar members 1100 and 1200 are secured to inward facing tracks 143 and 145.

FIG. 20 illustrates one possible configuration of a track 1410 and fittings 1420, 1430, and 1440 on a crossbar member 1400. Fittings 1420, 1430, and 1440 are commercially available from various industrial framing manufacturers (listed below). As described above, one of the advantages of the invention is that a vehicle owner may use a wide variety of readily available fittings, in conjunction with the track system, to customize his or her truck and adapt the truck to the owner's particular requirements at hand. It will be appreciated that other types of fittings, which include additional tracks, can be provided.

Figure 21:
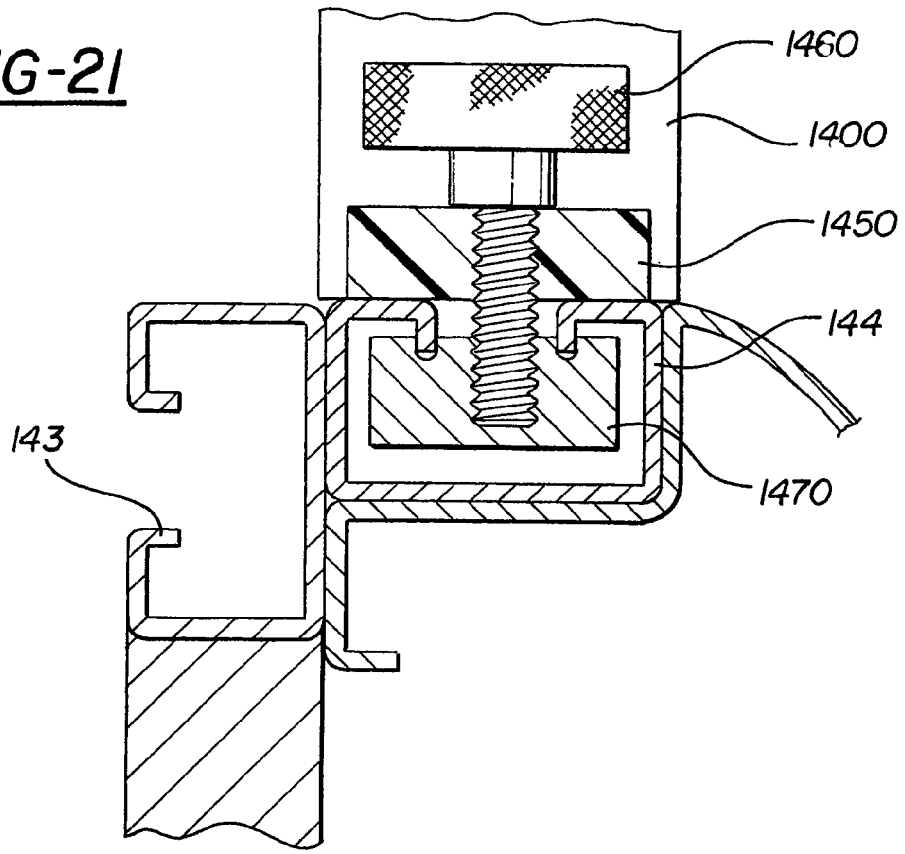
FIG. 21 illustrates a sectional view of plane 21-21 of FIG. 20.

FIG. 21 illustrates a sectional view of plane 21-21 of FIG. 20. As shown in FIG. 21, crossbar member 1400 is secured to track 144 by securing a horizontal portion 1450 of crossbar member 1400 to the track using a knob fitting 1460 and a nut 1470. A suitable design for such a fitting is illustrated in FIG. 6.

Figure 23:
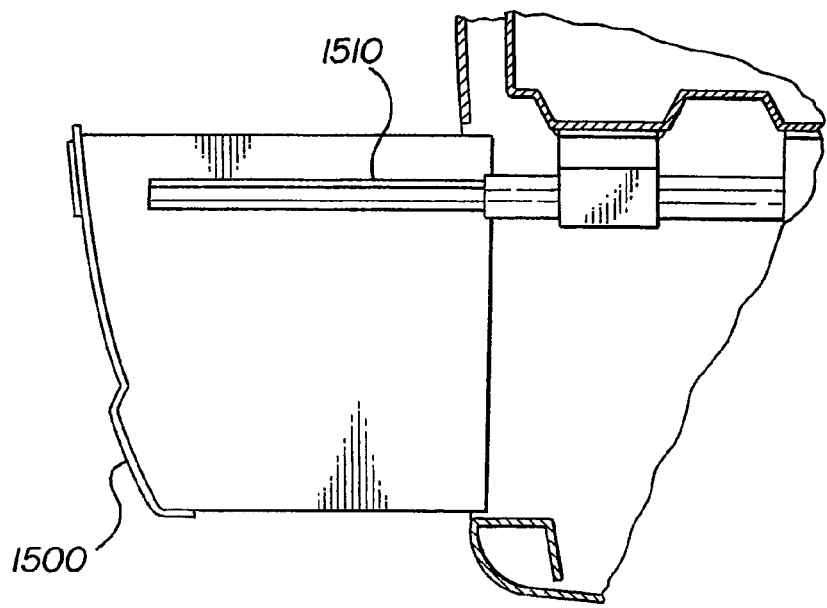
FIG. 23 is a sectional view of the storage box of FIG. 22.
Figure 22:
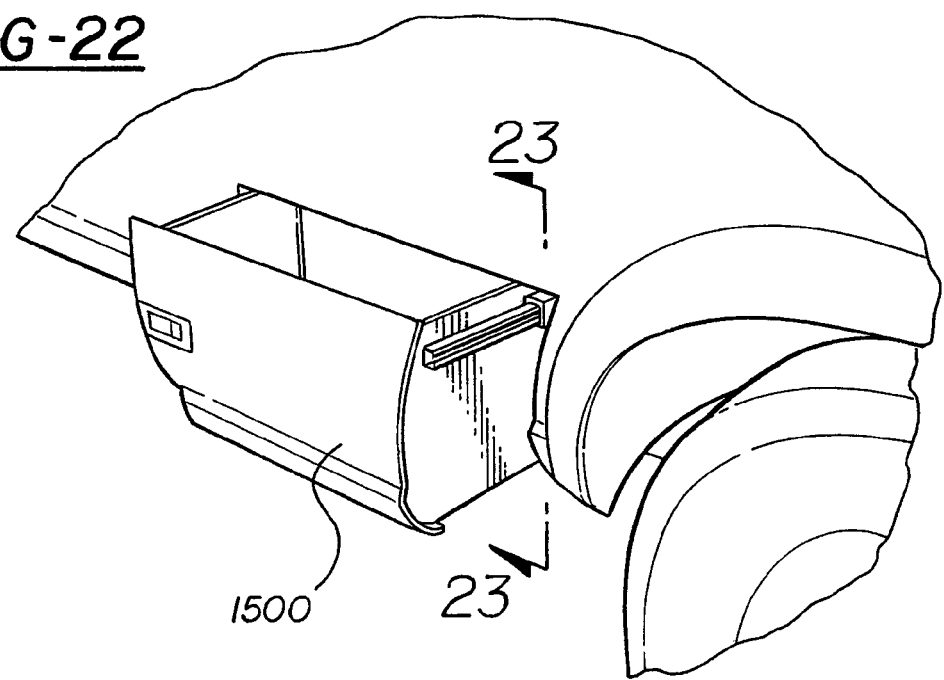
FIG. 22 illustrates an example of a storage box for storing tie-down fittings and/or other items.

FIGS. 22 and 23 illustrate an example of a storage box 1500 in an outer side panel of a truck for storing fittings and/or other items. The box 1500 is supported by a slide 1510.

FIG. 24 is an example of another arrangement 1600 of tracks, according to the invention. As illustrated in FIG. 24, arrangement 1600 includes tracks 1610, 1620, 1640, and 1650 mounted to the inner sidewall of a cargo bed 1680 such that the exterior contours of these tracks do not extend appreciably beyond the contour of the adjacent portions of the body. Similarly, track 1630 is mounted to the front wall of cargo bed 1680 such that the exterior contours of the track do not extend appreciably beyond the contour of the adjacent portions of the body.

FIG. 24 also illustrates tracks 1660 and 1670 which project approximately one inch above cargo bed 1680. Thus, tracks 1660 and 1670 do extend appreciably beyond the contour of adjacent portions of the body. FIG. 24 illustrates that tracks according to the invention (tracks 1610, 1620, 1630, 1640, and 1650) may be mounted on the same vehicle which also has tracks (1660 and 1670) which do extend appreciably beyond the contour of the adjacent portions of the body.

FIG. 25 is an example of another arrangement 1700 of a track 1710, according to the invention, that does not extend appreciably beyond the contour of adjacent portions 1720 of the body.

Figure 26:
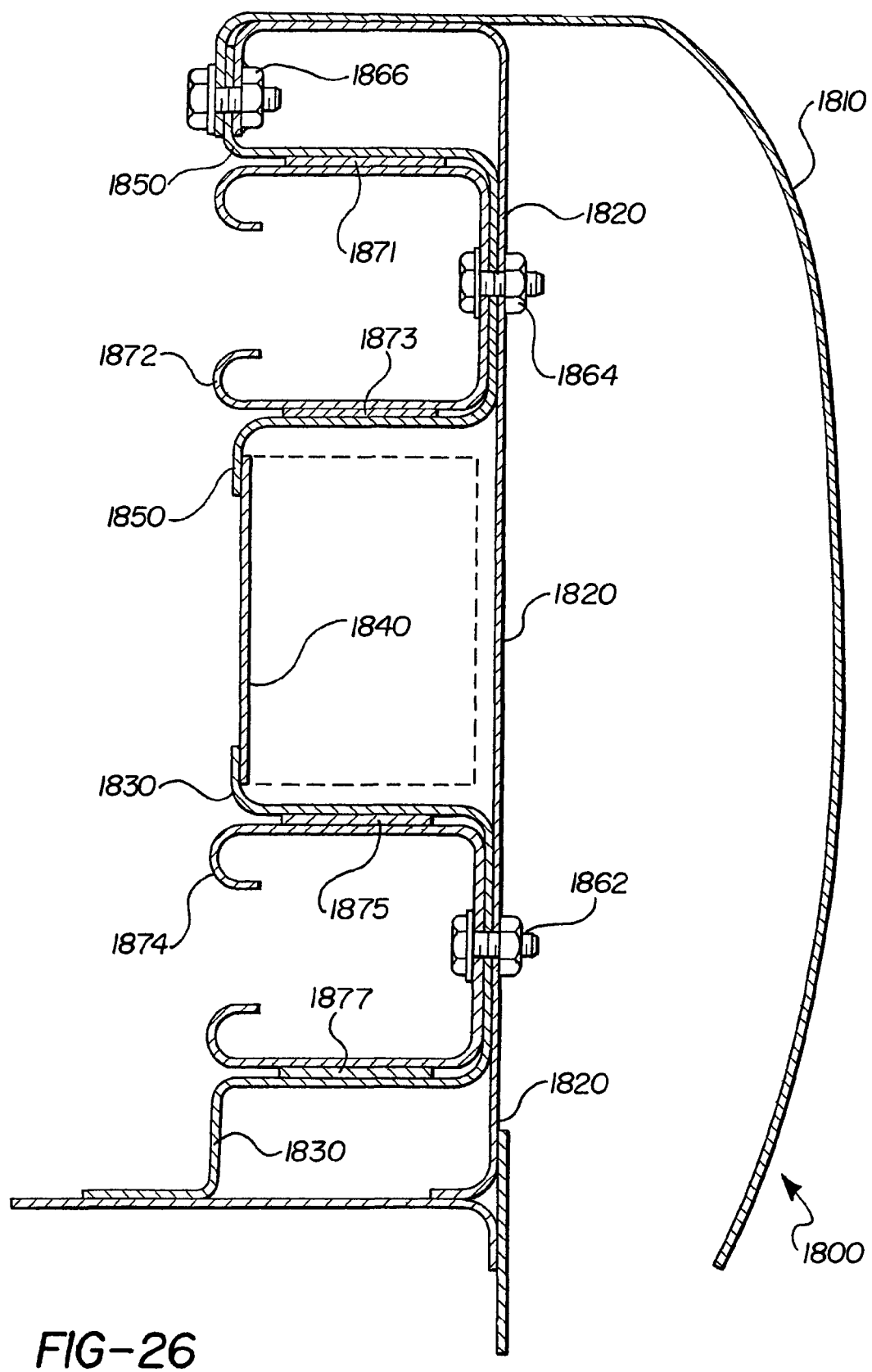
FIG. 26 is an example of another arrangement of tracks, according to the invention.

FIG. 26 is another example of another arrangement of tracks 1800, according to the invention. As shown in FIG. 26, the arrangement includes a number of body panels, 1810, 1820, 1830, 1840, and 1850. The body panels are joined, for example, by fasteners 1862, 1864, and 1866. Tracks 1872 and 1874 are mounted to the body panels by, for example, welds 1871, 1873, 1875, and 1877. The tracks can be connected to the body by other means, such as bolts. As shown in FIG. 26, the tracks 1872 and 1874 are mounted to the panels such that the exterior contours of tracks 1872 and 1874 do not extend appreciably beyond the adjacent portions of the body. In the most preferred embodiment, the exterior contours of the tracks are substantially flush with the adjacent portions of the body. However, the exterior contours of the track can extend up to one-eighth of an inch beyond the adjacent portions of the body, one-quarter of an inch beyond the contour of the adjacent portions of the body, or up to one-half of an inch beyond the contour of the adjacent portions of the body.

FIGS. 27 to 31 illustrate another type of fitting 1900 that may be used. If the fittings described above in connection with FIGS. 5 and 6 are not tightened enough or if the eye (or knob) is turned, the assembly can loosen and may fall out of the track. On the other hand, if the fitting is tightened too tightly, especially in the case of an aluminum track, there could be damage or premature wear of the track.

The FIG. 27-31 embodiment provides a more positive engagement with the track that does not rely as much on the user having the correct "feel" in tightening the thread/nut assembly. In this embodiment, the tie-down fitting does not clamp onto the track, but instead stays in place by a combination of a pin and a lock bar. As will be described below, this embodiment of the invention requires holes in the back side of the track(s).

As shown in the Figures, there are four major pieces to this design. A center shaft 1910 is provided with an eye 1920 (or other type of fitting/connection) on one end, a square shank 1930 in the middle, and a pin 1940 on the other end. Eye 1920, shank 1930, and pin 1940 are formed together as one piece. A rectangular lock bar 1950 is provided with a hole the same diameter as the pin end 1940 of the center shaft 1910. A spring locking ring 1960 has a square hole to match the shank 1930 of the center shaft and includes a recessed area which houses an internal spring 1968, notches for fingers, and a boss 1962 to engage the track opening. A set screw 1952, or pin, secures the lock bar 1950 to the center shaft. In this particular configuration, a link 1922 is attached to the eye 1920 of the center shaft.

To assemble the unit, the spring 1968 is slid onto the center shaft 1910 stopping against a larger diameter near the eye end. The locking ring 1960 is then slid over the square shank 1930 of the center shaft 1910. Then, the lock bar 1950 is installed over the center shaft pin 1940, and is aligned so that the long side of the lock bar 1950 is perpendicular to a long side of the locking ring boss 1962 and is screwed (or pinned) in place by screw 1952.

Figure 31:
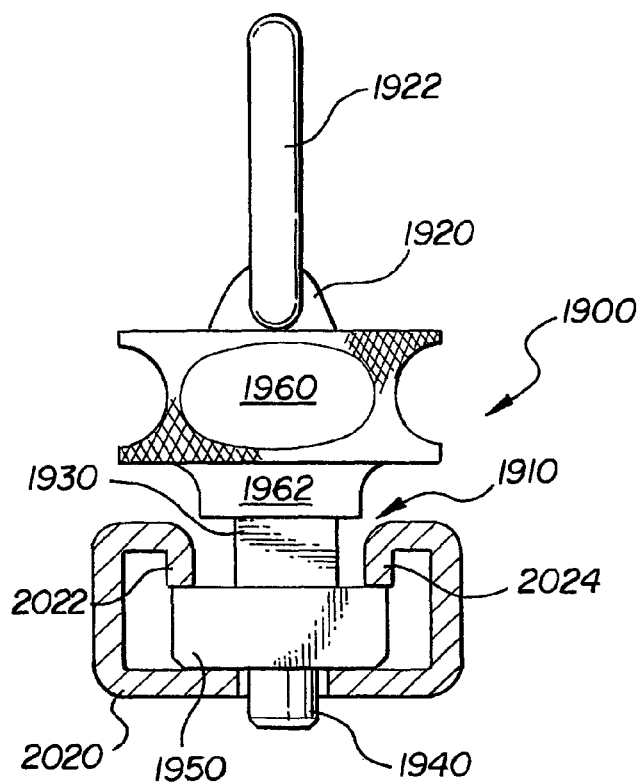
Figure 30:
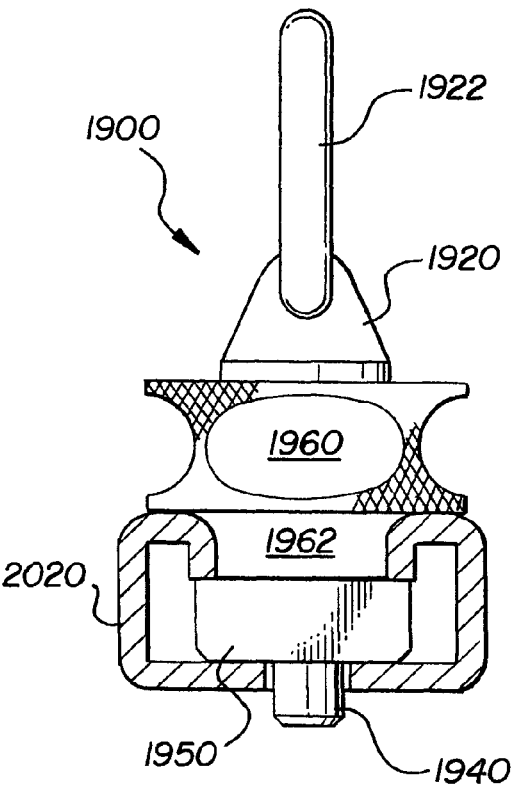

To install the fitting 1900, the entire unit is positioned in a track 2020, opposite a track hole 2010, with the lock bar 1950 aligned with the track, as shown in FIG. 29. The center shaft 1910 is pushed to overcome the spring pressure, allowing the lock bar 1950 to pass the sides of the track opening. Then, the entire unit is rotated until the boss 1962 on the locking ring 1960 aligns with the track opening and the spring forces the locking ring 1960 down against the track, as shown in FIG. 30. This also causes the lock bar 1950 to be wedged in between the back of track 2020 and track lips 2022 and 2024 (this keeps the pin 1940 engaged in the hole 2010 and keeps the entire assembly from pulling out of the track). To remove, the thumb pushes down on the center shaft 1910 and fingers on either side of the locking ring 1960 lift the locking ring 1960 and boss 1962 away from the track opening, as shown in FIG. 31. The entire unit is then rotated 90 degrees, allowing the locking bar 1950 to disengage from the track.

This embodiment thus provides an arrangement that is simple, easy to use, and provides very positive locking action. As long as the boss 1962 holds the lock bar 1950 from rotating, the only way to move or remove the tie-down fitting would require destruction or gross distortion of the track and/or tie-down fitting.

Figure 32:
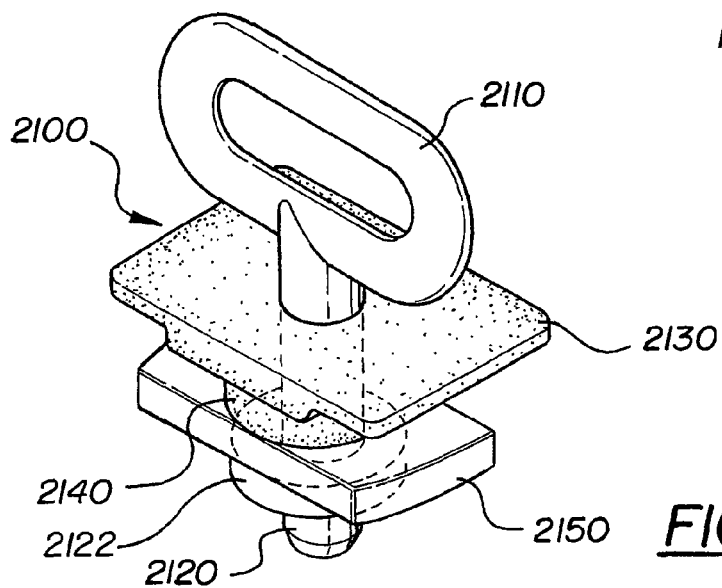
FIGS. 32 through 34 illustrate another type of fitting that may be used according to the invention.
Figure 33:
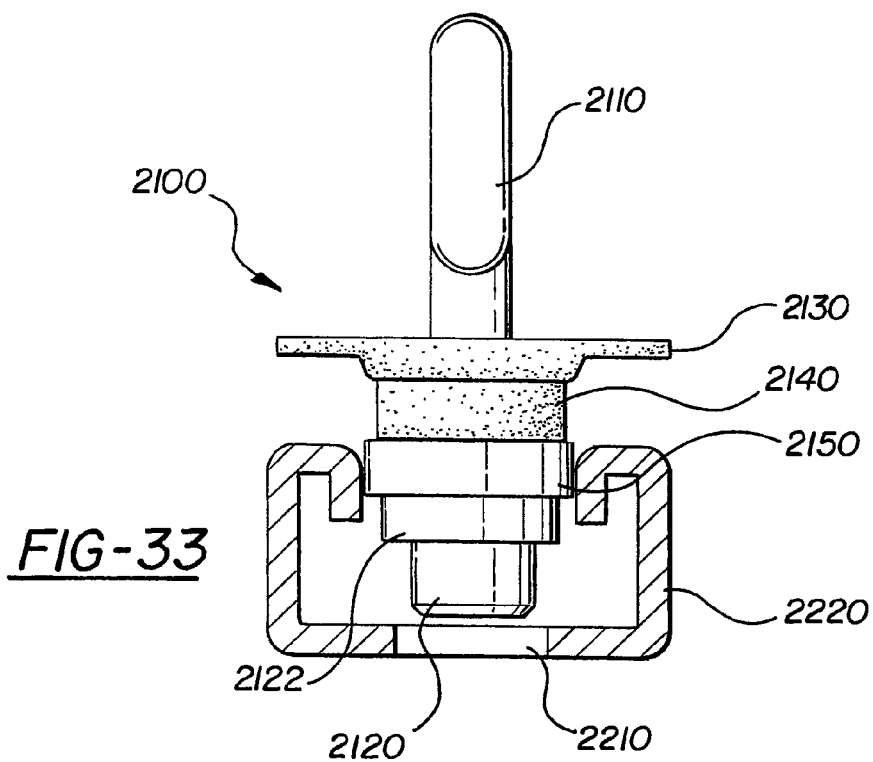
Figure 34:
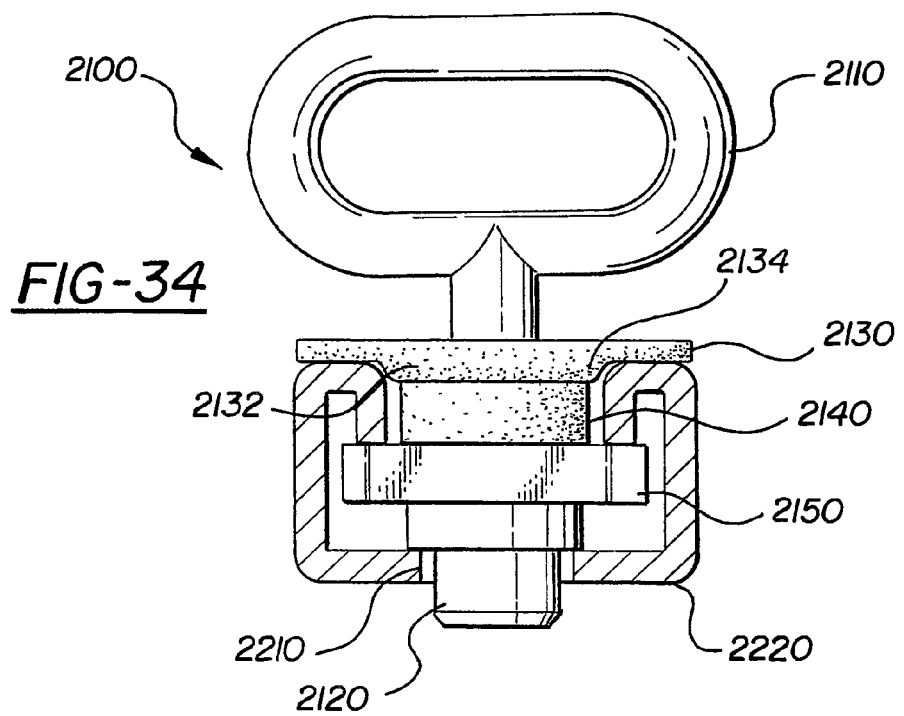

FIGS. 32 through 34 illustrate another type of fitting that may be used according to the invention. This type of fitting also requires tracks with holes. In this embodiment, the assembly 2100 includes a loop 2110 welded to a pin 2120 after the pin is inserted through a plastic (or metal) spring 2130 and spacer 2140, which in turn is mechanically bonded to a rectangular metal locking bar 2150. This arrangement allows the loop/pin assembly to spin freely with respect to spring 2130, spacer 2140, and locking bar 2150 at all times. A projection 2122 on the bottom of pin 2120 and a projection on the top of pin 2120 (not visible in the drawings) maintain spring 2130, spacer 2140, and bar 2150 on the pin (while still allowing relative rotation therebetween).

To use this fitting 2100, the fitting is positioned over the track 2220 above a track hole 2210, as shown in FIG. 33. The pin 2120 is inserted into the hole 2210, with the rectangular locking bar 2150 positioned to drop into the track. The spring 2130 (and therefore the locking bar 1950) is then twisted 90 degrees clockwise until detents 2132 and 2134 on the underside of the spring drop into the track, as shown in FIG. 34. The tension between spring 2130 and locking bar 2150 on the track 2220 maintain the assembly in this position.

To remove this tie-down, the spring 2130 (and the locking bar 2150) is rotated counter-clockwise.

Numerous other types of fittings may be used with the invention, for example, supports for plate glass racks, supports for ladders, and the like. Suitable off-the-shelf fittings are readily available for strut systems and are offered by, for example, Unistrut (Wayne, Mich.); Midland-Ross Corp., Superstrut Division, (Oakland, Calif.); and B-Line Systems, Inc. (Highland, Ill.).

The invention is not limited to the preferred embodiments described above. For example, a track could be mounted directly to the tailgate without the use of members 952 and 954. Variations and modifications of the invention will occur to those in the field, in light of the above teachings. The invention is therefore defined by reference to the following claims.

What is claimed is:

1. A cargo bed of a vehicle, comprising:
   a bed portion;

a side wall that extends generally perpendicular to the bed portion;

a first track that defines a first track slot with a first track slot opening, the first track slot facing inboard toward the bed portion, running generally parallel to the side wall, and being positioned on the side wall at an elevation between the bed portion and a top end of the side wall that is opposite the bed portion; and a second track slot that is located on the side wall and proximate the first track slot, the second track slot facing upward and running generally parallel to the side wall, the second track slot having a second track slot opening, wherein an upper-most portion of the second track slot opening is at an elevation higher than an upper-most portion of the first track slot opening, wherein the second track slot is no higher than the side wall.

2. The cargo bed of claim 1, wherein the first track slot defines a cavity, the cavity running generally parallel to the side wall and having a generally rectangular cross-section with a first width that is greater than a second width of the first track slot, and wherein the first track slot opening is an opening to the cavity.

3. The cargo bed of claim 1, wherein the second track slot defines a cavity, the cavity running generally parallel to the side wall and having a generally rectangular cross-section with a first width that is greater than a second width of the second track slot, and wherein the second track slot opening is an opening to the cavity.

4. The cargo bed of claim 1, wherein an outward facing surface adjacent to the second track slot is generally flush with the top end of the side wall.

5. The cargo bed of claim 2, further comprising lips that are located proximate to the first track slot opening and that protrude into the cavity.

6. The cargo bed of claim 3, further comprising lips that are located proximate to the second track slot opening and that protrude into the cavity.

7. The cargo bed of claim 1, wherein a first width of the first track slot and a second width of the second track slot are equal.

8. The cargo bed of claim 1, wherein the first track slot is configured to engage a fitting through the first track slot in order to retain an object.

9. The cargo bed of claim 1, wherein the second track slot is configured to engage a fitting through the second track slot in order to retain an object.

10. The cargo bed of claim 1, further comprising:
a second track that defines the second track slot.

11. The cargo bed of claim 10, wherein the first and second tracks are formed of different pieces of material.

12. The cargo bed of claim 10, wherein the first and second tracks are in contact with each other along a length of the first and second tracks.

13. The cargo bed of claim 10, wherein the first and second tracks are arranged proximate each other without any intervening vehicle body part.

14. The cargo bed of claim 10, wherein the first track slot and the second track slot are arranged proximate each other without any intervening vehicle body part other than structure forming the first track and the second track.

15. The cargo bed of claim 1, wherein the first track comprises, at an inboard side, a first vertical portion projected downward and a second vertical portion projected upward such that (1) a lower end of the first vertical portion and (2) an upper end of the second vertical portion define the first track slot opening.

16. The cargo bed of claim 15, further comprising inward lips that are located proximate to the first track slot opening.

\* \* \* \* \*